United States Patent
Peng et al.

(10) Patent No.: US 12,165,424 B2
(45) Date of Patent: Dec. 10, 2024

(54) IMAGE FORGERY DETECTION VIA PIXEL-METADATA CONSISTENCY ANALYSIS

(71) Applicant: PayPal, Inc., San Jose, CA (US)

(72) Inventors: Shanshan Peng, Singapore (SG); Jiazheng Zhang, Singapore (SG); Jiyi Zhang, Singapore (SG); Quan Jin Ferdinand Tang, Singapore (SG); Xiaodong Yu, Singapore (SG); Yuzhen Zhuo, Singapore (SG); Hong Qian, Shanghai (CN); Zhe Chen, Singapore (SG); Runmin Wen, Shanghai (CN)

(73) Assignee: PayPal, Inc., San Jose, CA (US)

( * ) Notice: Subject to any disclaimer, the term of this patent is extended or adjusted under 35 U.S.C. 154(b) by 524 days.

(21) Appl. No.: 17/374,439

(22) Filed: Jul. 13, 2021

(65) Prior Publication Data
US 2023/0005122 A1 Jan. 5, 2023

(30) Foreign Application Priority Data
Jun. 30, 2021 (WO) ................ PCT/CN2021/103613

(51) Int. Cl.
*G06V 20/00* (2022.01)
(52) U.S. Cl.
CPC .......... *G06V 20/95* (2022.01); *G06V 2201/10* (2022.01)

(58) Field of Classification Search
CPC .... G06V 20/95; G06V 2201/10; G06V 10/82; G06N 3/02–0985; G06T 2207/20081; G06T 2207/20084; G06T 7/0002
See application file for complete search history.

(56) References Cited

U.S. PATENT DOCUMENTS

| 2017/0206523 A1 | 7/2017 | Goeringer et al. |
| 2020/0364513 A1 | 11/2020 | Asendorf et al. |
| 2021/0083879 A1 | 3/2021 | Murialdo et al. |
| 2022/0398330 A1* | 12/2022 | Castinado ............... G06F 21/64 |
| 2022/0414854 A1* | 12/2022 | Gupta ..................... G06F 18/24 |

FOREIGN PATENT DOCUMENTS

| CN | 112614111 A | 4/2021 |
| WO | 2021/042763 A1 | 3/2021 |

OTHER PUBLICATIONS

Fan, Jiayuan. Image forensics on exchangeable image file format header. Diss. 2014. (Year: 2014).*

(Continued)

*Primary Examiner* — Geoffrey E Summers
(74) *Attorney, Agent, or Firm* — Greenberg Traurig, LLP

(57) ABSTRACT

Systems and/or techniques for facilitating image forgery detection via pixel-metadata consistency analysis are provided. In various embodiments, a system can receive an electronic image from a client device. In various cases, the system can obtain a pixel vector and/or an image metadata vector that correspond to the electronic image. In various aspects, the system can determine whether the electronic image is authentic or forged, based on analyzing the pixel vector and the image metadata vector via at least one machine learning model.

8 Claims, 10 Drawing Sheets

(56) References Cited

OTHER PUBLICATIONS

Ho, Kwan-Yuet. "Data Representation in Machine Learning." Sep. 15, 2019. <https://datawarrior.wordpress.com/2019/09/15/data-representation-in-machine-learning/>. (Year: 2019).*

Japan Electronics and Information Technology Industries Association. (2002). Exchangeable image file format for digital still cameras: Exif Version 2.2 (Jeita CP-3451). Jeita. (Year: 2002).*

Bedi, Punam, et al. "Identifying Forged Images Using Image Metadata." Proceedings of ICETIT 2019: Emerging Trends in Information Technology. Springer International Publishing, 2020. (Year: 2020).*

Gupta, Divyahans and Sanjay Kannan. "EXIF Estimation With Convolutional Neural Networks." Jun. 11, 2018. <http://cs231n.stanford.edu/reports/2017/pdfs/421.pdf>. (Year: 2018).*

Huh, Minyoung, et al. "Fighting Fake News: Image Splice Detection via Learned Self-Consistency." Computer Vision-ECCV 2018: 15th European Conference, Munich, Germany, Sep. 8-14, 2018, Proceedings, Part XI 15. Springer International Publishing, 2018. (Year: 2018).*

Tariq, Shahroz, et al. "Detecting both machine and human created fake face images in the wild." Proceedings of the 2nd international workshop on multimedia privacy and security. 2018. (Year: 2018).*

Villan, Muhammed Afsal, et al. "Fake image detection using machine learning." IRACST—International Journal of Computer Science and Information Technology & Security (IJCSITS) (2017). (Year: 2017).*

Zeng, Hui, Kang Deng, and Anjie Peng. "ISO Setting Estimation Based on Convolutional Neural Network and its Application in Image Forensics." Digital Forensics and Watermarking: 19th International Workshop, Melbourne, VIC, Australia, Nov. 25-27, 2020, Revised Selected Papers 19. Springer. (Year: 2021).*

International Search Report and Written Opinion Received for International PCT Application Serial No. PCT/CN2021/103613 dated Mar. 28, 2022, 10 pages.

* cited by examiner

IMAGE FORGERY DETECTION VIA PIXEL-METADATA CONSISTENCY ANALYSIS

TECHNICAL FIELD

The subject disclosure relates generally to forgery detection, and more specifically to image forgery detection via pixel-metadata consistency analysis.

BACKGROUND

Image forgery detection can be the task of determining whether an electronic image has been manually edited and/or otherwise tampered with. Thus, image forgery detection can be helpful to prevent certain types of fraud. Some existing techniques for facilitating image forgery detection include manual inspections and automated inspections that analyze image pixels directly. Manual inspections that analyze image pixels directly usually exhibit good fraud detection accuracy, but they are slow and expensive to perform. Existing automated inspections that analyze image pixels directly are much quicker than manual inspections, but they either are computationally expensive, have limited accuracy, and/or require substantial manual post-processing. Other existing techniques for facilitating image forgery detection include automated inspections that analyze image metadata, not image pixels, for traces/evidence of forgery. However, such existing automated techniques can fail since forgers can easily conceal such traces/evidence of forgery in image metadata.

Accordingly, systems and/or techniques that can address one or more of these technical problems can be desirable.

DETAILED DESCRIPTION

Figure 1:
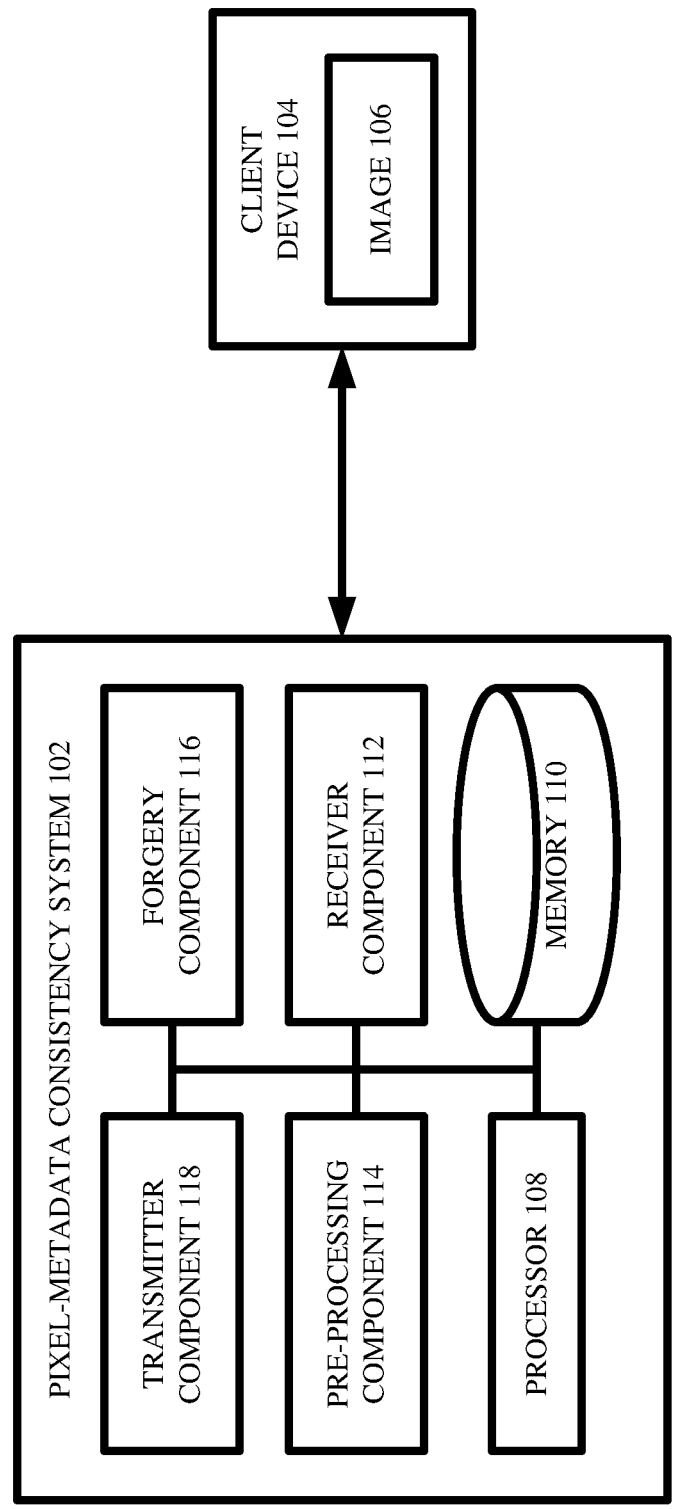
FIG. 1 illustrates a high-level block diagram of an example, non-limiting system that facilitates image forgery detection via pixel-metadata consistency analysis in accordance with one or more embodiments described herein.

The following detailed description is merely illustrative and is not intended to limit embodiments and/or application or uses of embodiments. Furthermore, there is no intention to be bound by any expressed or implied information presented in the preceding Background section, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Image forgery detection can be the task of determining whether an electronic image (e.g., a computer file representing an image) has been manually edited and/or otherwise tampered with. So, image forgery detection can be helpful to prevent certain types of fraud. For example, in various cases, a person and/or entity can be required to provide and/or otherwise present an electronic image of a proof-of-identity document (e.g., a driver's license, a passport, a birth certificate) as a prerequisite to participating in a restricted activity (e.g., establishing an electronic account/profile such as a financial account). In some cases, the person and/or entity can be not authorized to participate in the restricted activity. However, the person and/or entity can have forged and/or tampered with the electronic image of the proof-of-identity document (e.g., can have manipulated the pixels of the electronic image via photo-editing software), such that the electronic image of the proof-of-identity document appears to indicate that the person and/or entity is authorized to participate in the restricted activity. To prevent the unauthorized person and/or entity from participating in the restricted activity, image forgery detection can be implemented.

Some existing techniques for facilitating image forgery detection include manual inspections and/or automated inspections that analyze image pixels directly. Manual inspections that analyze raw image pixels usually exhibit good fraud detection accuracy, but they are slow and expensive to perform. Such manual inspections can include manually observing text fonts that are depicted in the electronic image and determining whether the text fonts are consistent with each other, manually observing different information blocks depicted in an electronic image and determining whether the information blocks are consistent with each other, and/or manually visually comparing an electronic image with a standardized template and determining whether the electronic image has any missing and/or misplaced parts. Unfortunately, it can take years to properly train a manual inspector. Moreover, even when properly trained, a manual inspector can take as long as several seconds to manually inspect an electronic image, which constitutes an excessive processing time.

Existing automated techniques that analyze image pixels directly are much quicker than manual inspections. However, such existing automated techniques have their own significant disadvantages. For instance, some existing automated techniques implement deep learning models to analyze raw image pixels. Such deep learning model techniques can achieve high accuracy, but they require very large amounts of computational resources to function. Other existing automated techniques that analyze raw image pixels (e.g., Error Level Analysis, Color Filter Array, Local Noise Analysis) can consume fewer computational resources during inference than deep learning model techniques, but they can exhibit significantly reduced accuracy and/or can require significant post-processing.

Other existing automated techniques can facilitate image forgery detection by analyzing image metadata, rather than raw image pixels. For instance, such existing automated techniques can include analyzing thumbnails, camera traces, compression signatures, decoding features, and/or quantization tables of an electronic image in search for traces of forgery. Although such existing automated techniques can achieve high accuracy of forgery detection, they can be easily sidestepped by forgers. This is due to the fact that forgers can easily manipulate image metadata so that any traces/evidence of forgery within the image metadata are eliminated.

Accordingly, systems and/or techniques that can address one or more of these technical problems can be desirable.

Various embodiments described herein can address one or more of these technical problems. One or more embodiments described herein include systems, computer-implemented methods, apparatus, and/or computer program products that can facilitate image forgery detection via pixel-metadata consistency analysis. In other words, various embodiments described herein can include a computerized tool (e.g., any suitable combination of computer-executable hardware and/or computer-executable software) that can electronically receive an electronic image (e.g., an image of a proof-of-identity document) and that can electronically analyze both the raw pixels of the electronic image and the metadata accompanying the electronic image. Based on both the raw pixels and the metadata, the computerized tool can electronically infer whether the electronic image is authentic or forged.

As explained above, many existing automated techniques for facilitating image forgery detection take into consideration only the raw pixels of an electronic image and do not take into consider the metadata of the electronic image (e.g., Error Level Analysis, Color Filter Array, Local Noise Analysis). As also explained above, existing automated techniques for facilitating image forgery detection that do take into consideration image metadata are easily sidestepped by forgers (e.g., the image metadata can be maliciously edited so that any evidence of forgery in the metadata is erased).

The inventors of various embodiments described herein realized that the robustness of image forgery detection can be improved when both raw pixels and metadata are taken into account. Specifically, in various cases, the computerized tool described herein can be considered as electronically predicting what metadata an electronic image should have, based on the raw pixels of the electronic image. In various instances, the computerized tool can also be considered as electronically comparing the predicted metadata with actual metadata of the electronic image. If the predicted metadata matches and/or is consistent with the actual metadata, the computerized tool can conclude that the electronic image is authentic. On the other hand, if the predicted metadata fails to match and/or is not consistent with the actual metadata, the computerized tool can conclude that the electronic image is not authentic (e.g., is forged). Accordingly, the computerized tool can identify a forged electronic image, even if the actual metadata has been maliciously modified to hide evidence of forgery.

In various embodiments, a computerized tool as described herein can comprise a receiver component, a pre-processing component, a forgery component, and/or a transmitter component.

In various embodiments, the receiver component of the computerized tool can electronically receive and/or can otherwise electronically access an electronic image. In various cases, the receiver component can electronically retrieve the electronic image from any suitable client device (e.g., a client desktop computer, a client laptop computer, a client smart phone). In various other cases, the computerized tool can electronically retrieve the electronic image from any other suitable data structure (e.g., graph data structure, relational data structure, hybrid data structure) that is electronically accessible to the receiver component, whether the data structure is centralized and/or decentralized, and/or whether the data structure is local to and/or remote from the receiver component. In any case, the receiver component can electronically access the electronic image, such that other components of the computerized tool can be able to interact with (e.g., read, write, copy, edit) the electronic image.

In various aspects, the electronic image can comprise and/or otherwise be associated with a pixel vector and a metadata vector. In various instances, the pixel vector can be any suitable vector whose elements are scalars that numerically represent the pixel values of the electronic image. That is, the pixel vector can represent the raw pixels of the electronic image. In various cases, the metadata vector can be any suitable vector whose elements are scalars, vectors, matrices, tensors, and/or character strings that represent metadata information with which the electronic image is tagged. As a non-limiting example, the metadata vector can contain exchangeable image file format (Exif) tags that were embedded into and/or appended to the electronic image by an imaging device (e.g., camera) that captured the electronic image and/or by imaging software (e.g., Photoshop®) that opened and/or edited the electronic image. In various non-limiting examples, such Exif tags can include: image height as measured in number of pixels; image width as measured in number of pixels; timestamp marking time/date of creation; timestamp marking time/date of most recent editing; x resolution; y resolution; aperture value; color space; camera model that captured the electronic image; and/or software which created/edited the electronic image. Those having ordinary skill in the art will appreciate that any other suitable Exif tags can be implemented in various aspects.

In various embodiments, the pre-processing component of the computerized tool can electronically generate, via a first machine learning model, a consistency vector based on both the pixel vector and the metadata vector. In various aspects, the consistency vector can be considered as representing and/or capturing a level of consistency between the pixel vector and the metadata vector. In various cases, the pre-processing component can leverage the first machine learning model in at least two different ways so as to generate the consistency vector.

In one or more first embodiments, the first machine learning model of the pre-processing component can be configured and/or trained (e.g., via supervised training, unsupervised training, and/or reinforcement learning) to predict metadata tags based on raw pixels. That is, the first machine learning model of the pre-processing component can electronically receive as input the pixel vector of the electronic image and can electronically produce as output a predicted metadata vector based on the pixel vector. In various cases, the predicted metadata vector generated by the first machine learning model can be considered as representing the Exif tags that the electronic image should have, whereas the metadata vector obtained by the receiver component can be considered as representing the Exif tags that the electronic image actually does have.

In various aspects, the predicted metadata vector can have the same dimensionality as the metadata vector. For example, if the metadata vector includes n Exif tags for any suitable positive integer n, then the first machine learning model can be configured to predict all n of the Exif tags of the electronic image. In various other aspects, the predicted metadata vector can have a smaller dimensionality than the metadata vector. For example, if the metadata vector includes n Exif tags, then the first machine learning model can be configured to predict m of the n Exif tags of the electronic image, for any suitable positive integers m<n (e.g., there can be dozens or even hundreds of Exif tags in the metadata vector, and it can be the case that only some of such Exif tags are pertinent to forgery detection; accordingly, the first machine learning model can be configured/trained to predict the values of only those pertinent Exif tags).

In various instances, the pre-processing component can then compute the consistency vector based on the predicted metadata vector and the metadata vector. As an example, the consistency vector can be obtained by concatenating the predicted metadata vector with the metadata vector. As another example, the predicted metadata vector can, in some cases, be subtracted from the metadata vector (e.g., if the predicted metadata vector includes m elements, it can be subtracted from the corresponding m elements of the metadata vector, leaving the remaining n-m elements of the metadata vector unchanged), and such difference can be concatenated with the metadata vector, thereby yielding the consistency vector.

In such one or more first embodiments, the first machine learning model of the pre-processing component can exhibit any suitable artificial intelligence architecture. For example, in some cases, the first machine learning model can be a one-vs-rest classifier. In various other cases, the first machine learning model can exhibit any other suitable architecture (e.g., deep learning architecture including any suitable number of layers, any suitable numbers of neurons in various layers, any suitable activation functions in various neurons, and/or any suitable interneuron connectivity patterns).

In such one or more first embodiments, the first machine learning model can be trained in any suitable fashion to predict metadata vectors based on pixel vectors. For example, a training dataset can comprise a set of training pixel vectors and set of ground truth metadata vectors that respectively correspond to the set of training pixel vectors. In various instances, the first machine learning model can have randomly initialized parameters (e.g., weights, biases). In various cases, the first machine learning model can receive as input a training pixel vector and can generate output based on the training pixel vector. In various aspects, the parameters of the first machine learning model can be iteratively updated via backpropagation based on an error between the output and a ground truth metadata vector corresponding to the inputted training pixel vector. When this is performed for each of the training pixel vectors in the set of training pixel vectors, the parameters of the first machine learning model can be iteratively optimized to predict metadata vectors from pixel vectors. Those having ordinary skill in the art will appreciate that such training can be conducted using any suitable number of epochs and/or any suitable batch sizes.

In one or more second embodiments that are alternative to the one or more first embodiments, the first machine learning model of the pre-processing component can be configured and/or trained (e.g., via supervised training, unsupervised training, and/or reinforcement learning) to generate embedded representations based on raw pixels. More specifically, there can be a set of training pixel vectors that respectively correspond to a set of ground truth metadata vectors. In various aspects, the first machine learning model of the pre-processing component can be a triplet network, and the triplet network can be trained, via a triplet loss technique, to generate embeddings based on the set of training pixel vectors. That is, the first machine learning model can be configured to receive as input a training pixel vector and to produce as output a training embedding that represents the training pixel vector. In various cases, the training embedding can be any suitable vectorial representation of the training pixel vector that has fewer dimensions/elements than the training pixel vector. In various aspects, the first machine learning model can generate a training embedding for each training pixel vector in the set of training pixel vectors, thereby yielding a set of training embeddings that respectively correspond to the set of training pixel vectors.

Since triplet loss can be utilized to train the first machine learning model, the Euclidean distances between two different training embeddings in the set of training embeddings can be related to the ground truth metadata vectors of the two different training pixel vectors that correspond to the two different training embeddings. For instance, if two training pixel vectors are known to have similar ground truth metadata vectors, the two training embeddings of those two training pixel vectors can be close to and/or near each other (e.g., can be separated by a Euclidean distance that is below any suitable threshold). On the other hand, if two training pixel vectors are known to have dissimilar ground truth metadata vectors, the two training embeddings of those two training pixel vectors can be far from and/or not near each other (e.g., can be separated by a Euclidean distance that is above any suitable threshold). In other words, the first machine learning model can be trained to assign embeddings to pixel vectors, where the embeddings of pixel vectors tend to be close to each other when the pixel vectors have similar metadata vectors, and where the embeddings of pixel vectors tend to be far from each other when the pixel vectors have dissimilar metadata vectors.

As mentioned above, the set of training pixel vectors can respectively correspond to a set of ground truth metadata vectors. Since the set of training embeddings generated by the first machine learning model can likewise respectively correspond to the set of training pixel vectors, the set of ground truth metadata vectors can be considered as respectively corresponding to the set of training embeddings. In various instances, each of the set of training embeddings can be concatenated with a respective one of the set of ground truth metadata vectors, with the result being a set of concatenated vectors. In various aspects, the pre-processing component can electronically apply and/or otherwise fit a multivariate Gaussian mixture model to the set of concatenated vectors. Such application of the Gaussian mixture model can cause the pre-processing component to iteratively identify the parameters (e.g., centroid, covariance) of two different Gaussian distributions within the set of concatenated vectors, where a first Gaussian distribution represents authentic concatenated vectors, and where a second Gaussian distribution represents forged concatenated vectors.

Now, consider again the pixel vector and the metadata vector obtained by the receiver component. In various cases, the pre-processing component can feed the pixel vector to the first machine learning model of the one or more second embodiments, thereby causing the first machine learning model to generate an embedding that represents the pixel vector. In various instances, the pre-processing component can concatenate the embedding with the metadata vector, thereby yielding a concatenated vector. In various aspects, the pre-processing component can then utilize the Gaussian mixture model that was fitted to the training data of the first machine learning model, so as to identify a first posterior probability that the concatenated vector belongs to the first Gaussian distribution (e.g., a likelihood that the concatenated vector is authentic), and so as to identify a second posterior probability that the concatenated vector belongs to the second Gaussian distribution (e.g., a likelihood that the concatenated vector is forged). In various cases, the two posterior probabilities can be formatted together as one posterior probabilities vector. In various aspects, the pre-processing component can concatenate the posterior probabilities vector with the metadata vector, and the result of such concatenation can be considered as the consistency vector.

In any case, the pre-processing component can utilize the first machine learning model to generate the consistency vector based on the pixel vector and the metadata vector, where the consistency vector contains information that captures how consistent and/or inconsistent the pixel vector is with the metadata vector. Indeed, as mentioned above, in the one or more first embodiments, the first machine learning model can predict what the metadata vector should look like based on the pixel vector, and the consistency vector can be computed based on the predicted metadata vector and the metadata vector. As also mentioned above, in the one or more second embodiments, the first machine learning model can generate an embedding based on the pixel vector, the embedding can be concatenated with the metadata vector, posteriors of the concatenation can be computed based on a Gaussian mixture model that has been fitted to the training data of the first machine learning model, and the consistency vector can be computed based on the posteriors and the metadata vector.

In various embodiments, the forgery component of the computerized tool can electronically determine, via a second machine learning model, whether the electronic image is forged or authentic, based on the consistency vector generated by the pre-processing component. That is, the second machine learning model can be trained and/or configured to receive as input the consistency vector and to produce as output an authenticity classification, where the authenticity classification indicates that the electronic image is authentic or forged. In various aspects, the second machine learning model can exhibit any suitable machine learning architecture (e.g., can be a deep learning model that includes any suitable number of layers, any suitable numbers of neurons in various layers, any suitable activation functions in various neurons, and/or any suitable interneuron connectivity patterns). As a specific non-limiting example, the second machine learning model can be an XGBoost classifier trained via supervised training.

In various embodiments, the transmitter component of the computerized tool can electronically generate a validation message based on the authenticity classification generated by the forgery component. For example, if the authenticity classification indicates that the electronic image is authentic, the validation message can indicate that the electronic image has been successfully validated. On the other hand, if the authenticity classification indicates that the electronic image is forged, the validation message can indicate that the electronic image has failed to be successfully validated. In any case, the transmitter component can electronically transmit the validation message to the client device and/or the data structure from which the electronic image was obtained by the receiver component. In various instances, the transmitter component can electronically transmit the validation message to any other suitable computing device as desired.

Accordingly, the computerized tool as described herein can electronically leverage both raw pixel data of an electronic image and Exif metadata of the electronic image, so as to determine whether the electronic image is authentic or forged. Note that the computerized tool can accurately detect forgery even in the presence of malicious modification of the metadata vector of the electronic image. Specifically, the consistency vector generated by the pre-processing component can be considered as containing information regarding what the metadata vector actually is, and, due to the functionalities of the pre-processing component, the consistency vector can further be considered as containing information regarding what the metadata vector should be given the pixel vector. Thus, if a forger attempts to evade detection by maliciously editing the metadata vector, the consistency vector can reveal and/or otherwise contain indications of such malicious editing, and the computerized tool can accordingly determine that the electronic image is forged. In stark contrast, as explained above, existing automated techniques simply cannot detect forgery in the presence of such malicious editing of the metadata vector.

Various embodiments described herein can be employed to use hardware and/or software to solve problems that are highly technical in nature (e.g., to facilitate image forgery detection via pixel-metadata consistency analysis), that are not abstract and that cannot be performed as a set of mental acts by a human. Further, some of the processes performed can be performed by a specialized computer (e.g., trained machine learning models such as artificial neural networks, one-vs-rest classifiers, XGBoost models, Gaussian mixture models) for carrying out defined tasks related to image forgery detection via pixel-metadata consistency analysis.

For example, some defined tasks of various embodiments described herein can include: accessing, by a device operatively coupled to a processor, an electronic image provided by a client device; identifying, by the device, a pixel vector and a metadata vector that correspond to the electronic image; and labeling, by the device, the electronic image as authentic or forged, based on analyzing the pixel vector and the metadata vector via at least one artificial intelligence algorithm.

In various cases, such defined tasks can further include: executing, by the device, a first trained artificial intelligence algorithm on the pixel vector, wherein the first trained artificial intelligence algorithm generates a predicted metadata vector based on the pixel vector; concatenating, by the device, the predicted metadata vector with the metadata vector, thereby yielding a concatenated vector; and executing, by the device, a second trained artificial intelligence algorithm on the concatenated vector, wherein the second trained artificial intelligence algorithm classifies the electronic image as authentic or forged based on the concatenated vector.

In various other cases, such defined tasks can further include: executing, by the device, a first trained artificial intelligence algorithm on the pixel vector, wherein the first trained artificial intelligence algorithm generates an embedding based on the pixel vector; concatenating, by the device, the embedding with the metadata vector, thereby yielding a first concatenated vector; applying, by the device, a Gaussian mixture model to the first concatenated vector, thereby yielding a vector of posterior probabilities; concatenating, by the device, the vector of posterior probabilities with the metadata vector, thereby yielding a second concatenated vector; and executing, by the device, a second trained artificial intelligence algorithm on the second concatenated vector, wherein the second trained artificial intelligence algorithm classifies the electronic image as authentic or forged based on the second concatenated vector.

Such defined tasks are not performed manually by humans. Indeed, neither the human mind nor a human with pen and paper can electronically retrieve an electronic image from a client device, and/or electronically determine whether the electronic image is authentic or forged by electronically executing artificial intelligence algorithms and/or Gaussian mixture models on a pixel vector and a metadata vector of the electronic image. Instead, various embodiments described herein are inherently and inextricably tied to computer technology and cannot be implemented outside of a computing environment. Specifically, various embodiments can be considered as a computerized tool that utilizes machine learning models to analyze both raw pixel data and embedded metadata of an electronic image, so as to automatically infer whether the electronic image is forged. Such a computerized tool cannot be practicably implemented in any sensible way by human beings without computers.

In various instances, embodiments described herein can integrate into a practical application the disclosed teachings regarding image forgery detection via pixel-metadata consistency analysis. Indeed, in various embodiments, the disclosed teachings can provide a computerized tool that can automatically evaluate the validity of an electronic image (e.g., an image of a driver's license, a passport, a visa) based on both the raw pixels of the electronic image and the Exif metadata appended to the electronic image. Specifically, the computerized tool can electronically receive and/or identify a pixel vector of the electronic image and an Exif metadata vector of the electronic image. In various cases, the computerized tool can, via a first machine learning model, electronically generate a consistency vector based on both the pixel vector and the Exif metadata vector. In some embodiments, the first machine learning model can predict what the Exif metadata should be based on the pixel vector, and such predicted Exif metadata can be concatenated with the actual Exif metadata vector of the electronic image, thereby yielding the consistency vector. In other embodiments, the first machine learning model can generate an embedding based on the pixel vector, the embedding can be concatenated with the Exif metadata vector of the electronic image, posteriors of the concatenation can be computed based on a Gaussian mixture model that has been fitted to data used to train the first machine learning model, and such posteriors can be concatenated with the Exif metadata vector of the electronic image, thereby yielding the consistency vector. Once the consistency vector is computed, the computerized tool can generate, via a second machine learning model, a binary authenticity classification based on the consistency vector. In various cases, the computerized tool can then take action based on the outputted authenticity classification (e.g., can transmit a failure and/or success message based on the classification, can permit and/or restrict access to sensitive data based on the classification). Such a computerized tool that can automatically evaluate the authenticity of an electronic image is certainly a useful and/or practical application of computers. Furthermore, in stark contrast to existing techniques, such a computerized tool can accurately detect forgery even when the Exif metadata vector of the electronic image has been maliciously edited by forgers in an attempt to evade detection. Because existing techniques do not rely on both raw pixel data and Exif metadata as described herein, they cannot detect forgery when the Exif metadata vector has been maliciously edited. Accordingly, the computerized tool as described herein constitutes a concrete and tangible technical improvement in the field of image forgery detection.

Moreover, in various aspects, embodiments described herein can control real-world and/or tangible devices based on the disclosed teachings. For example, a computerized tool as described herein can electronically evaluate the authenticity of a real-world, tangible proof-of-identity document (e.g., a driver's license, a passport, a birth certificate) that is depicted in an electronic image via pixel-metadata consistency analysis, can electronically render successful validation messages and/or unsuccessful validation messages on any suitable computer screen/monitor based on the evaluated authenticity, and/or can grant and/or deny access to protected data based on the evaluated authenticity.

It should be appreciated that the figures described herein are non-limiting examples of various embodiments.

FIG. 1 illustrates a high-level block diagram of an example, non-limiting system 100 that can facilitate image forgery detection via pixel-metadata consistency analysis in accordance with one or more embodiments described herein.

As shown, a pixel-metadata consistency system 102 can be electronically integrated, via any suitable wired and/or wireless electronic connection, with a client device 104. In various cases, the client device 104 can be any suitable computing device that can electronically capture and/or otherwise electronically store an image 106. As some non-limiting examples, the client device 104 can be a desktop computer operated by any suitable client and/or entity (e.g., human and/or otherwise), a laptop computer operated by any suitable client and/or entity, and/or a smart phone operated by any suitable client and/or entity.

In various aspects, the image 106 can be any suitable electronic image. In some cases, the image 106 can depict a proof-of-identity document, such as a driver's license of the client and/or entity that operates the client device 104, a passport of the client and/or entity that operates the client device 104, a birth certificate of the client and/or entity that operates the client device 104, a student identification card of the client and/or entity that operates the client device 104, an employment identification card of the client and/or entity that operates the client device 104, and/or any other suitable document that purports to prove the identity of the client and/or entity that operates the client device 104 (and/or that purports to prove the identity of any other person and/or entity).

In various instances, the image 106 can comprise pixel data that is formatted as a pixel vector (e.g., a vector of values exhibited by the pixels of the image 106). Accordingly, the dimensionality of the pixel vector can be equal to and/or otherwise based on the number of pixels in the image 106 (e.g., if the image 106 has x pixels for any suitable positive integer x, the pixel vector can have x elements, one element per pixel).

Furthermore, in various instances, the image 106 can comprise and/or otherwise be associated with metadata that is formatted into a metadata vector. In various aspects, the metadata vector can include any suitable number of any suitable Exif tags that pertain to the image 106 and/or that are otherwise generated by the camera and/or software that captured and/or created the image 106. As some non-limiting examples, such metadata tags can include: height of the image 106, width of the image 106, orientation of the image 106, date/time at which the image 106 was created/captured, date/time that the image 106 was recently edited, x-resolution of the image 106, y-resolution of the image 106, make and/or model of camera that captured the image 106, software that captured and/or edited the image 106, YCbCr positioning of the image 106, resolution unit of the image 106, aperture value of the camera that captured the image 106, scene type of the image 106, exposure bias value of the camera that captured the image 106, exposure program of the camera that captured the image 106, color space of the image 106, unique identification number of the image 106, maximum aperture value of the camera that captured the image 106, brightness value of the image 106, white balance mode of the camera that captured the image 106, exposure mode of the camera that captured the image 106, exposure time of the camera that captured the image 106, whether flash was used by the camera that captured the image 106, F-number of the camera that captured the image 106, and/or ISO speed of the camera that captured the image 106. The aforementioned are mere non-limiting examples of Exif metadata tags that can be included in the metadata vector of the image 106. Those having ordinary skill in the art will appreciate that any other suitable metadata information (e.g., Exif metadata information and/or non-Exif metadata information), can be included in the metadata vector in various instances.

In various aspects, it can be desired to determine whether the image 106 is authentic or forged. That is, it can be desired to infer whether some entity, such as the client and/or entity that operates the client device 104, has tampered with and/or otherwise edited the image 106. As described herein, the pixel-metadata consistency system 102 can facilitate such forgery detection.

In various embodiments, the pixel-metadata consistency system 102 can comprise a processor 108 (e.g., computer processing unit, microprocessor) and a computer-readable memory 110 that is operably coupled to the processor 108. The memory 110 can store computer-executable instructions which, upon execution by the processor 108, can cause the processor 108 and/or other components of the pixel-metadata consistency system 102 (e.g., receiver component 112, pre-processing component 114, forgery component 116, transmitter component 118) to perform one or more acts. In various embodiments, the memory 110 can store computer-executable components (e.g., receiver component 112, pre-processing component 114, forgery component 116, transmitter component 118), and the processor 108 can execute the computer-executable components.

In various embodiments, the pixel-metadata consistency system 102 can comprise a receiver component 112. In some cases, the receiver component 112 can electronically retrieve and/or otherwise electronically access the image 106 from the client device 104, such that the receiver component 112 can identify and/or obtain the pixel vector of the image 106 and the metadata vector of the image 106. In some other cases, the receiver component 112 can electronically retrieve and/or otherwise electronically access the image 106 from any suitable centralized and/or decentralized data structure (not shown), whether remote from and/or local to the receiver component 112, such that the receiver component 112 can identify and/or obtain the pixel vector of the image 106 and the metadata vector of the image 106. In any case, the receiver component 112 can have electronic access to the pixel vector of the image 106 and to the metadata vector of the image 106, such that other components of the pixel-metadata consistency system 102 can manipulate, analyze, and/or otherwise interact with the pixel vector and/or the metadata vector.

In various embodiments, the pixel-metadata consistency system 102 can comprise a pre-processing component 114. In various aspects, the pre-processing component 114 can electronically generate a consistency vector based on both the pixel vector and the metadata vector. In various instances, the consistency vector can be considered as containing information that conveys a level of consistency and/or inconsistency between the pixel vector and the metadata vector. In other words, the consistency vector can, in some cases, be considered as indicating whether, given the pixel vector, the metadata vector is as expected or is not as expected. To facilitate generation of the consistency vector, the pre-processing component 114 can leverage a first machine learning model. In various cases, the pre-processing component 114 can leverage the first machine learning model in at least two alternative fashions so as to compute the consistency vector.

In one or more first embodiments, the first machine learning model can a one-vs-rest classifier that is trained and/or configured to predict image metadata based on image pixel data. In other words, the pre-processing component 114 can electronically input the pixel vector of the image 106 into the first machine learning model, and the first machine learning model can electronically produce as output a predicted metadata vector based on the pixel vector. In various instances, the predicted metadata vector can be considered as the metadata (e.g., the Exif tags) that the first machine learning model concludes that the image 106 should have, while the metadata vector received by the receiver component 112 can be considered as the metadata (e.g., the Exif tags) that the image 106 actually does have. In various aspects, the pre-processing component 114 can electronically compute the consistency vector based on the predicted metadata vector and the metadata vector. For example, the consistency vector can, in some cases, be equal to a concatenation of the predicted metadata vector and the metadata vector. As another example, the consistency vector can, in some cases, be equal to a concatenation of the metadata vector and a difference between the predicted metadata vector and the metadata vector. In any case, the consistency vector can include and/or contain information regarding what the metadata of the image 106 actually is and what the metadata of the image 106 should be.

In one or more second embodiments, the first machine learning model can be a triplet network that is trained and/or configured to generate embedded representations based on image pixel data. In other words, there can be a set of training images, with each training image comprising a training pixel vector, a training metadata vector, and a ground truth authenticity label. In various cases, the first machine learning model can be trained on the training pixel vectors and the ground truth authenticity labels to generate embeddings. That is, the first machine learning model can receive as input a training pixel vector and can produce as output an embedding (e.g., any suitable vector) based on the training pixel vector. Because the first machine learning model can be a triplet network and can thus be trained via a triplet loss technique, the first machine learning model can respectively generate two different embeddings for two different training pixel vectors, where such two different embeddings can tend to be separated by a small (e.g., less than any suitable threshold value) Euclidean distance if the two different training pixel vectors have similar and/or the same ground truth metadata vectors, and where such two different embeddings can tend to be separated by a large (e.g., greater than any suitable threshold value) Euclidean distance if the two different training pixel vectors have dissimilar and/or very different ground truth metadata vectors. Once trained, the first machine learning model can generate an embedding for each training pixel vector. Moreover, each of such embeddings can be concatenated with a corresponding training metadata vector. In various aspects, a Gaussian mixture model can be applied and/or fitted to such concatenations, so as to identify centroids and/or covariances of two different Gaussian distributions: a first Gaussian distribution representing authentic images in the set of training images, and a second Gaussian distribution representing forged images in the set of training images.

Accordingly, in various aspects, the pre-processing component 114 can electronically input the pixel vector of the image 106 into the first machine learning model, and the first machine learning model can electronically produce as output an embedding based on the pixel vector. In various instances, the pre-processing component 114 can concatenate the embedding with the metadata vector of the image 106. In various cases, the pre-processing component 114 can then leverage the Gaussian mixture model mentioned above to compute posterior probabilities for the concatenation. Specifically, the pre-processing component 114 can compute a first posterior probability indicating a likelihood that the concatenation belongs to the first Gaussian distribution (e.g., indicating a likelihood that the image 106 is authentic), and the pre-processing component 114 can compute a second posterior probability indicating a likelihood that the concatenation belongs to the second Gaussian distribution (e.g., indicating a likelihood that the image 106 is forged). In various aspects, the first posterior probability and the second posterior probability can be formatted together into a single posterior probabilities vector (e.g., a vector having two scalar elements). In various instances, the pre-processing component 114 can electronically compute the consistency vector based on the posterior probabilities vector and the metadata vector. For example, the consistency vector can, in some cases, be equal to a concatenation of the posterior probabilities vector and the metadata vector.

In various embodiments, the pixel-metadata consistency system 102 can comprise a forgery component 116. In various aspects, the forgery component 116 can electronically determine, via a second machine learning model, whether the image 106 is authentic or forged, based on the consistency vector generated by the pre-processing component 114. More specifically, the second machine learning model can be an XGBoost model that is trained and/or otherwise configured to infer image authenticity based on consistency vectors. Accordingly, in various instances, the forgery component 116 can electronically feed the consistency vector generated by the pre-processing component 114 as input to the second machine learning model, and the second machine learning model can electronically produce as output an authenticity classification that labels the image 106 as authentic or that labels the image 106 as forged. As mentioned above, the forgery component 116 can accurately classify the authenticity of the image 106, even if the metadata vector of the image 106 has been maliciously tampered with (e.g., the first machine learning model as described herein can enable the consistency vector to include an indication of not just what the metadata of the image 106 actually is, but also an indication of what the metadata of the image 106 should be).

In various embodiments, the pixel-metadata consistency system 102 can comprise a transmitter component 118. In various aspects, the transmitter component 118 can electronically generate, in any suitable fashion, an authenticity report/notification that indicates and/or communicates the resulting authenticity classification determined by the forgery component 116. In various cases, the transmitter component 118 can electronically transmit the authenticity report/notification to the client device 104. In various other cases, the transmitter component 118 can electronically transmit the authenticity report/notification to any other suitable computing device (not shown), as desired.

Figure 2:
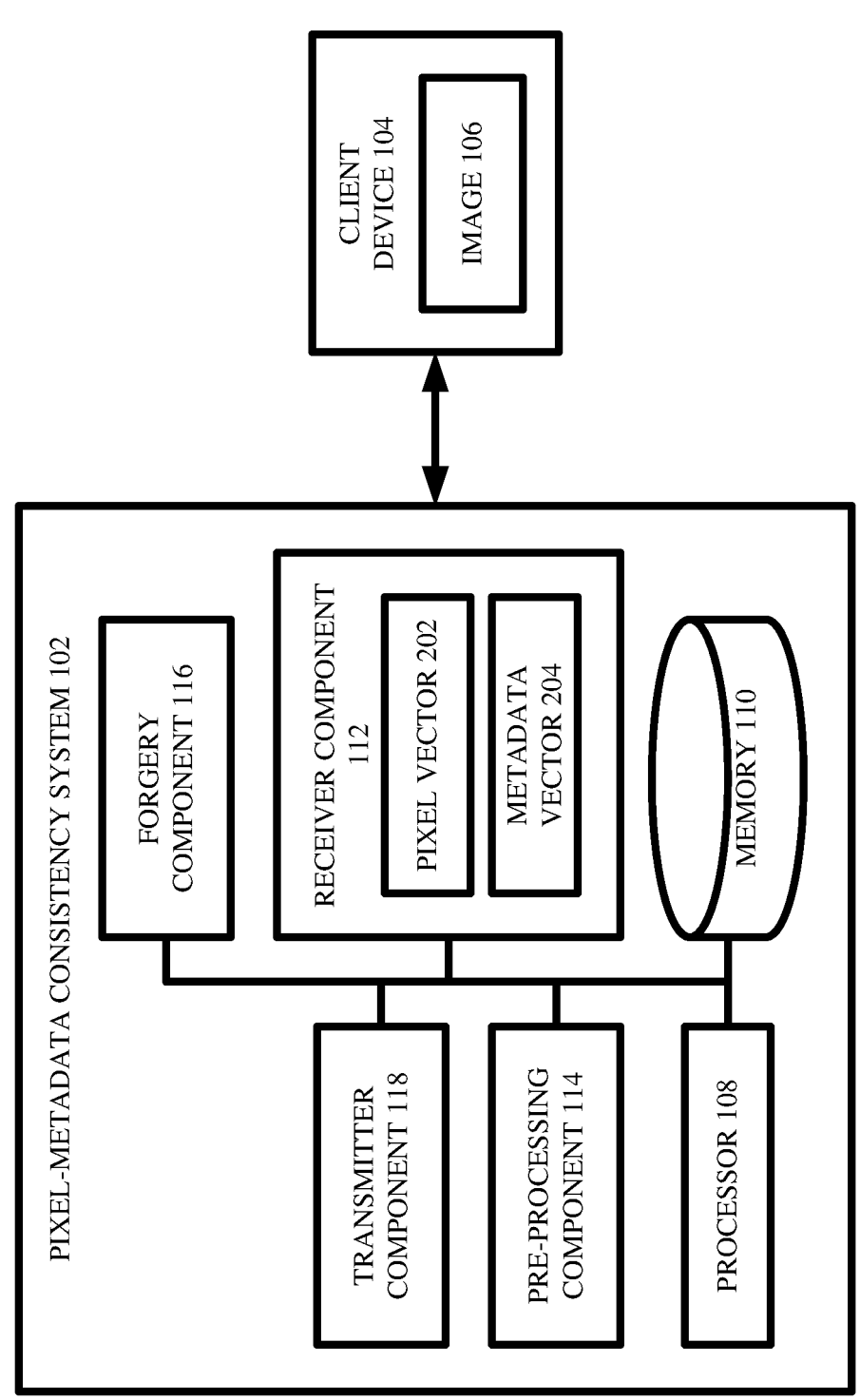
FIG. 2 illustrates a high-level block diagram of an example, non-limiting system including a pixel vector and a metadata vector that facilitates image forgery detection via pixel-metadata consistency analysis in accordance with one or more embodiments described herein.

FIG. 2 illustrates a high-level block diagram of an example, non-limiting system 200 including a pixel vector and a metadata vector that can facilitate image forgery detection via pixel-metadata consistency analysis in accordance with one or more embodiments described herein. As shown, the system 200 can, in some cases, comprise the same components as the system 100, and can further comprise a pixel vector 202 and/or a metadata vector 204.

In various embodiments, the receiver component 112 can electronically receive the pixel vector 202 and/or the metadata vector 204 from the client device 104 (and/or from any other suitable computing device, not shown), where the pixel vector 202 and the metadata vector 204 can collectively define the image 106. In various aspects, the pixel vector 202 can be a vector of any suitable dimensionality, the elements of which are scalars that represent the pixels of the image 106. That is, the elements of the pixel vector 202 can be respective pixel values of the image 106. In various instances, the metadata vector 204 can be a vector of any suitable dimensionality, the elements of which are scalars, vectors, matrices, tensors, and/or character strings that represent metadata tags of the image 106. As an example, the metadata vector 204 can be an Exif vector. That is, the elements of the metadata vector 204 can be Exif attributes of the image 106. As mentioned above, non-limiting examples of such Exif attributes can include: image height, image width, image orientation, date/time of creation/capture, date/time of editing, x/y resolution, camera make and/or camera model, editing software, YCbCr positioning, aperture value, maximum aperture value, exposure bias value, exposure program, color space, unique identification number, brightness value, white balance mode, exposure mode, exposure time, flash enabled, F-number, and/or ISO speed. It is to be understood that these are mere non-limiting examples of Exif metadata tags that can be included in the metadata vector 204. Those having ordinary skill in the art will appreciate that any other suitable metadata information (e.g., Exif metadata information and/or non-Exif metadata information), can be included in the metadata vector 204.

Figure 3:
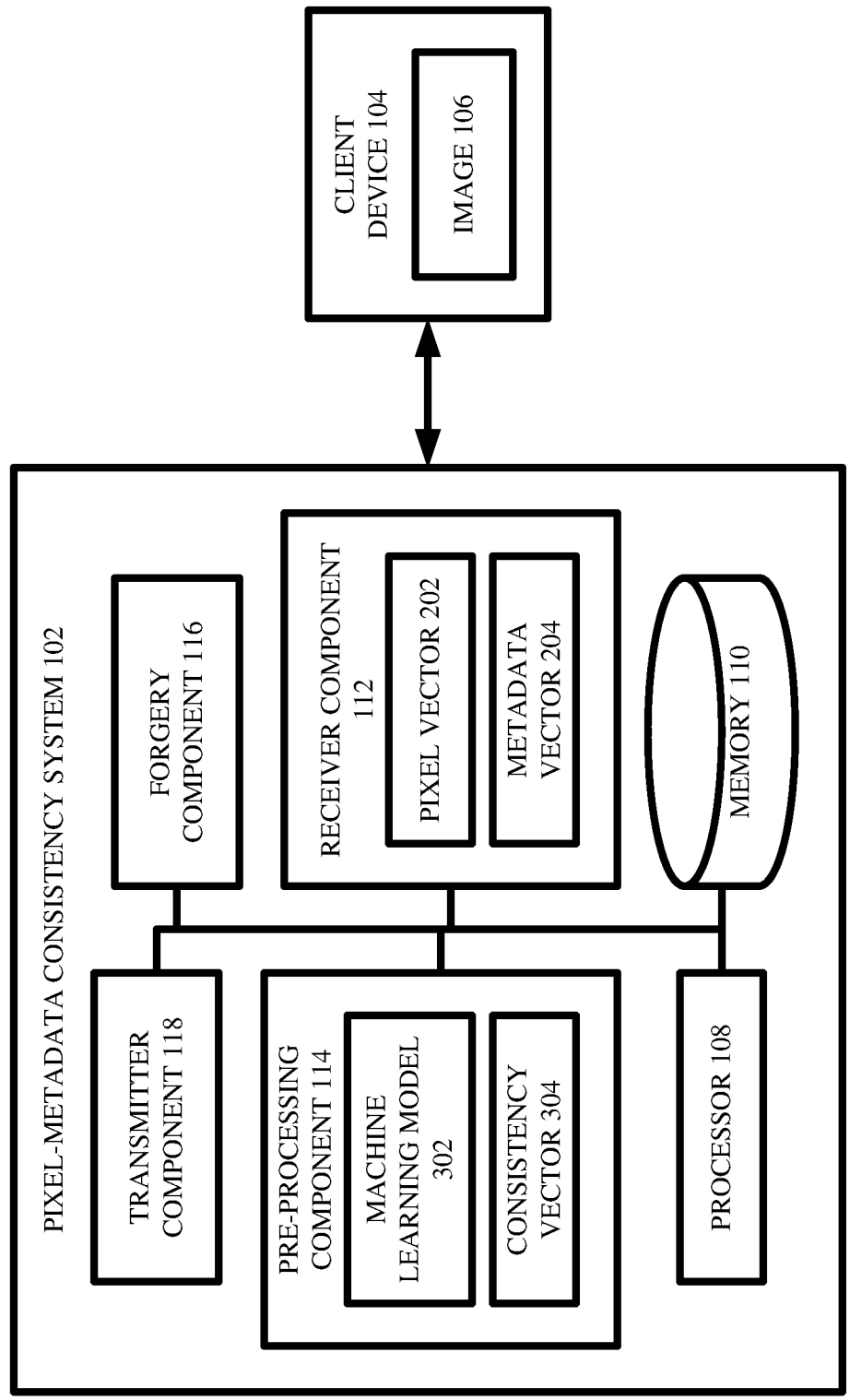
FIG. 3 illustrates a high-level block diagram of an example, non-limiting system including a machine learning model and a consistency vector that facilitates image forgery detection via pixel-metadata consistency analysis in accordance with one or more embodiments described herein.

FIG. 3 illustrates a high-level block diagram of an example, non-limiting system 300 including a machine learning model and a consistency vector that can facilitate image forgery detection via pixel-metadata consistency analysis in accordance with one or more embodiments described herein. As shown, the system 300 can, in some cases, comprise the same components as the system 200, and can further comprise a machine learning model 302 and/or a consistency vector 304.

In various embodiments, the pre-processing component 114 can electronically control, operate, and/or maintain the machine learning model 302. In various instances, the machine learning model 302 can exhibit any suitable artificial intelligence architecture (e.g., deep learning model, support vector machine, regression model, ensemble model). In various cases, the pre-processing component 114 can electronically utilize the machine learning model 302 to generate the consistency vector 304, based on both the pixel vector 202 and the metadata vector 204. In various cases, the consistency vector 304 can be a vector of any suitable dimensionality, the elements of which collectively indicate how consistent and/or how inconsistent the metadata vector 204 is with the pixel vector 202. In various aspects, there are at least two alternative and non-limiting ways in which the pre-processing component 114 can generate the consistency vector 304 via the machine learning model 302. These two alternative and non-limiting ways are respectively described with respect to FIGS. 4-5.

Figure 4:
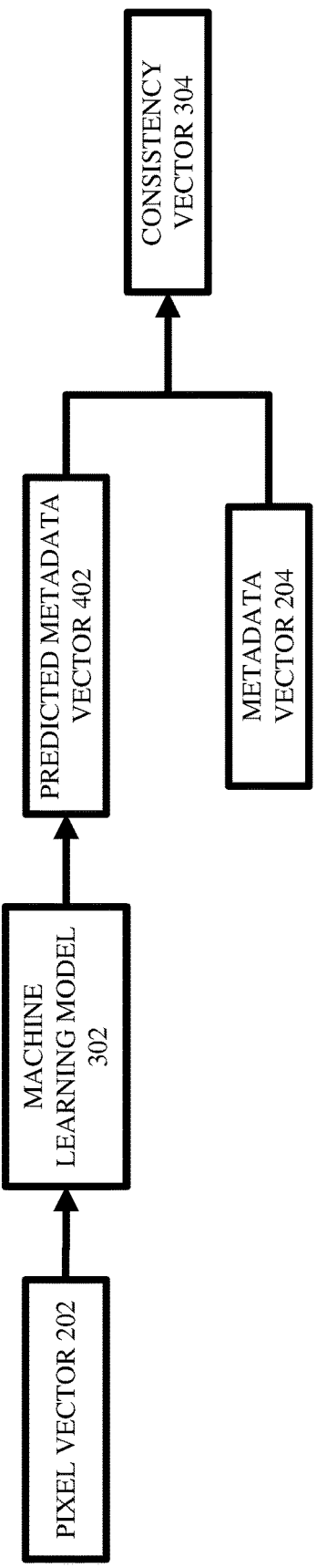
FIG. 4 illustrates an example, non-limiting block diagram showing how a machine learning model can be leveraged to generate a consistency vector based on a pixel vector and a metadata vector in accordance with one or more embodiments described herein.

FIG. 4 illustrates an example, non-limiting block diagram 400 showing how a machine learning model can be leveraged to generate a consistency vector based on a pixel vector and a metadata vector in accordance with one or more embodiments described herein. In other words, FIG. 4 depicts a first example and non-limiting way in which the machine learning model 302 can be leveraged to generate the consistency vector 304 based on both the pixel vector 202 and the metadata vector 204.

In various embodiments that pertain to FIG. 4, the machine learning model 302 can be a one-vs-rest classifier that can be trained and/or otherwise configured to predict one or more metadata tags for an electronic image, based on raw pixel data of the electronic image. For example, consider a training dataset that comprises k training images, for any suitable positive integer k. In various instances, each of the training images can include a respectively corresponding training pixel vector, a respectively corresponding training metadata vector, and/or a respectively corresponding ground truth authenticity label. So, there can be k training pixel vectors, k training metadata vectors, and/or k ground truth authenticity labels, all respectively corresponding to each other.

In various aspects, the internal parameters (e.g., weights, biases) of the machine learning model 302 can be randomly initialized. In various instances, for any given training pixel vector, the machine learning model 302 can receive as input the given training pixel vector and can produce as output a given predicted metadata vector that is based on the given training pixel vector. In various cases, the given predicted metadata vector can be considered as representing the metadata tags (e.g., Exif tags) which the machine learning model 302 believes that the given training pixel vector should have. However, when the machine learning model 302 has undergone no and/or little training, the given predicted metadata vector can be inaccurate. Accordingly, an error and/or loss can be computed between the given predicted metadata vector and a given training metadata vector that respectively corresponds to the given training pixel vector. In various aspects, such error and/or loss can be used to update the internal parameters of the machine learning model 302 through backpropagation. In various cases, this training procedure can be repeated for each of the k training pixel vectors, with the result being that the internal parameters of the machine learning model 302 can be iteratively optimized.

After such training, the pre-processing component 114 can, in some aspects as shown in FIG. 4, electronically feed the pixel vector 202 to the machine learning model 302. In various instances, this can cause the machine learning model 302 to electronically generate as output a predicted metadata vector 402. In various cases, the predicted metadata vector 402 can be considered as representing the Exif metadata tags which the machine learning model 302 believes should correspond to the pixel vector 202. In other words, the predicted metadata vector 402 can be the Exif metadata tags which the image 106 should have. In various cases, the predicted metadata vector 402 can have the same dimensionality as the metadata vector 204 (e.g., the machine learning model 302 can be trained/configured to estimate values for all of the Exif metadata fields included in the metadata vector 204, such that the predicted metadata vector 402 and the metadata vector 204 have the same number of elements). In various other cases, the predicted metadata vector 402 can have a smaller dimensionality than the metadata vector 204 (e.g., the machine learning model 302 can be trained/configured to estimate values for fewer than all of the Exif metadata fields included in the metadata vector 204, such that the predicted metadata vector 402 has fewer elements than the metadata vector 204). For instance, suppose that the metadata vector 204 includes 86 elements (e.g., 86 Exif tags). It can be the case that not all of those 86 elements are pertinent and/or relevant to predicting image forgery. Accordingly, the machine learning model 302 can be trained/configured to predict/estimate any suitable subset of those 86 elements when given the pixel vector 202 (e.g., in some cases, software in which the image 106 was edited/opened, camera make/model that captured the image 106, and/or time/date of creation/editing of the image 106 can be considered as some Exif metadata tags that are most predictive of forgery, and so the machine learning model 302 can be configured to estimate those Exif metadata tags and not other Exif metadata tags).

In any case, as shown in FIG. 4, the pre-processing component 114 can electronically compute the consistency vector 304 based on the predicted metadata vector 402 and the metadata vector 204. For example, the consistency vector 304 can be equal to a concatenation of the predicted metadata vector 402 and the metadata vector 204 (e.g., concatenating the predicted metadata vector 402 with the metadata vector 204 can yield the consistency vector 304). As another example, the predicted metadata vector 402 can be subtracted from the metadata vector 204 to yield a difference vector, and the consistency vector 304 can be equal to a concatenation of the difference vector and the metadata vector 204 (e.g., subtracting the predicted metadata vector 402 from the metadata vector 204 and concatenating such difference with the metadata vector 204 can yield the consistency vector 304). In various instances, the consistency vector 304 can be any other suitable function of the predicted metadata vector 402 and the metadata vector 204.

Although the above discussion indicates that the machine learning model 302 can be a one-vs-rest classifier, this is a mere non-limiting example. Those having ordinary skill in the art will appreciate that the machine learning model 302 can, in various cases, exhibit any other suitable machine learning architecture that can be trained/configured to predict metadata from raw pixel data.

Figure 5:
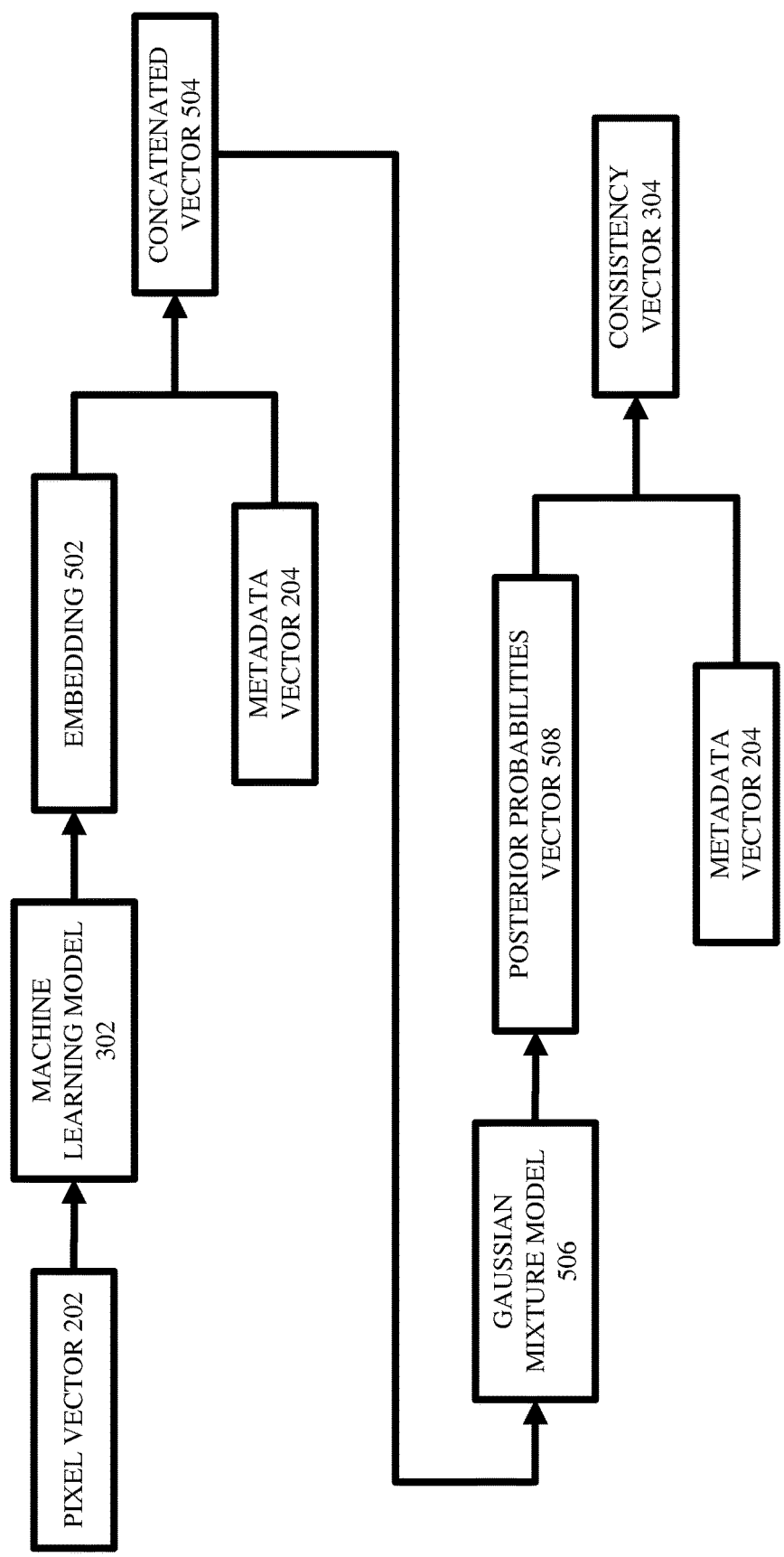
FIG. 5 illustrates an example, non-limiting block diagram showing how a machine learning model and a Gaussian mixture model can be leveraged to generate a consistency vector based on a pixel vector and a metadata vector in accordance with one or more embodiments described herein.

FIG. 5 illustrates an example, non-limiting block diagram 500 showing how a machine learning model and a Gaussian mixture model can be leveraged to generate a consistency vector based on a pixel vector and a metadata vector in accordance with one or more embodiments described herein. In other words, FIG. 5 depicts a second example and non-limiting way in which the machine learning model 302 can be leveraged to generate the consistency vector 304 based on both the pixel vector 202 and the metadata vector 204.

In various embodiments that pertain to FIG. 5, the machine learning model 302 can be a triplet network that can be trained and/or otherwise configured to produce embedded representations of an electronic image, based on raw pixel data of the electronic image. For example, consider again a training dataset that comprises k training images, for any suitable positive integer k. As above, each of the training images can include a respectively corresponding training pixel vector, a respectively corresponding training metadata vector, and/or a respectively corresponding ground truth authenticity label. So, there can be k training pixel vectors, k training metadata vectors, and/or k ground truth authenticity labels, all respectively corresponding to each other.

In various aspects, the internal parameters (e.g., weights, biases) of the machine learning model 302 can be randomly initialized. In various instances, the machine learning model 302 can be trained via a triplet loss technique to generate embeddings (e.g., vector representations of any suitable dimensionalities) based on inputted pixel vectors. For example, for any first training pixel vector, the machine learning model 302 can receive as input the first training pixel vector and can produce as output a first embedding (e.g., a vector) that is based on the first training pixel vector. Next, the machine learning model can receive a second training pixel vector that is known to correspond to a ground truth metadata vector that is similar to and/or the same as that of the first training pixel vector, and the machine learning model 302 can produce a second embedding based on the second training pixel vector. Furthermore, the machine learning model can receive a third training pixel vector that is known to correspond to a ground truth metadata vector that is dissimilar to and/or highly different from that of the first training pixel vector, and the machine learning model 302 can produce a third embedding based on the third training pixel vector.

At this point, a first error/loss can be computed between the first embedding and the second embedding, and a second error/loss can be computed between the first embedding and the third embedding. Since the first training pixel vector and the second training pixel vector have similar and/or the same ground truth metadata vectors, it can be desired that the first error/loss is minimized. That is, it can desired that the first embedding and the second embedding are close, near, and/or similar to each other. On the other hand, since the first training pixel vector and the third training pixel vector have very different and/or dissimilar ground truth metadata vectors, it can be desired that the second error/loss is maximized. That is, it can desired that the first embedding and the third embedding are far and/or different from each other. Thus, the first error/loss and the second error/loss can be used to facilitate backpropagation, so as to update the internal parameters of the machine learning model 302. In various cases, this training procedure can be repeated for each of the k training pixel vectors, with the result being that the internal parameters of the machine learning model 302 can be iteratively optimized to generate embeddings based on pixel vectors.

At this point, the machine learning model 302 can be considered as fully trained. In various instances, the machine learning model 302 can then generate an embedding for each of the k training pixel vectors, thereby yielding k embeddings. Since triplet loss can be used to train the machine learning model 302 as described above, those of the k embeddings that are near (e.g., in terms of Euclidean distance) to each other can be considered as likely to correspond to the same ground truth authenticity label, whereas those of the k embeddings that are far (e.g., in terms of Euclidean distance) from each other can be considered as likely to correspond to different ground truth authenticity labels. In various aspects, each of the k embeddings can then be concatenated with a respectively corresponding one of the k metadata vectors, thereby yielding k concatenated vectors.

In various cases, a Gaussian mixture model 506 can be applied to the k concatenated vectors. As those having ordinary skill in the art will appreciate, when given a total set of data, multivariate Gaussian mixture modeling can be considered as a mathematical techniques for iteratively identifying (e.g., such as via expectation maximization) the parameters of multiple constituent Gaussian distributions that make up the total set of data. In this case, the Gaussian mixture model 506 can be applied to the k concatenations, and the result can be the estimation of the parameters (e.g., centroid and/or covariance) of two different Gaussians to which the k concatenations collectively belong. In various cases, a first Gaussian of the two different Gaussians can be considered as representing those of the k concatenations that are authentic (e.g., that correspond to ground truth authenticity labels that indicate authentic and/or not forged). In various cases, a second Gaussian of the two different Gaussians can be considered as representing those of the k concatenations that are forged (e.g., that correspond to ground truth authenticity labels that indicate forged and/or not authentic). In any case, once the Gaussian mixture model 506 is applied to the k concatenations, the centroids and/or covariances of both the first and second Gaussians can be estimated and/or known.

At this point, the pre-processing component 114 can, in some aspects as shown in FIG. 5, electronically feed the pixel vector 202 to the machine learning model 302. In various instances, this can cause the machine learning model 302 to electronically generate as output an embedding 502. In various cases, the embedding 502 can be considered as a vector that represents the pixel vector 202. In various cases, the embedding 502 can have any suitable dimensionality that is lesser than the dimensionality of the pixel vector 202. In various aspects, as shown in FIG. 5, the pre-processing component 114 can electronically compute a concatenated vector 504 based on the embedding 502 and the metadata vector 204. That is, concatenating the embedding 502 with the metadata vector 204 can yield the concatenated vector 504.

In various instances, the pre-processing component 114 can then apply the Gaussian mixture model 506 to the concatenated vector 504, thereby yielding a posterior probabilities vector 508. More specifically, as explained above, the Gaussian mixture model 506 can be fitted to the k concatenations generated by the machine learning model 302 during training, such that the centroids and/or covariances of the first and second Gaussians are estimated/known. Since the centroids and/or covariances of the first and second Gaussians are estimated/known, the pre-processing component 114 can compute a first posterior probability indicating a likelihood that the concatenated vector 504 belongs to the first Gaussian, and the pre-processing component 114 can also compute a second posterior probability indicating a likelihood that the concatenated vector 504 belongs to the second Gaussian. These two posterior probabilities can be formatted together as the posterior probabilities vector 508 (e.g., a first element of the posterior probabilities vector 508 can be equal to the first posterior probability, and a second element of the posterior probabilities vector 508 can be equal to the second posterior probability).

In various instances, as shown, the pre-processing component 114 can then compute the consistency vector 304 based on the posterior probabilities vector 508 and the metadata vector 204. For example, the consistency vector 304 can be equal to a concatenation of the posterior probabilities vector 508 and the metadata vector 204 (e.g., concatenating the posterior probabilities vector 508 with the metadata vector 204 can yield the consistency vector 304). In various instances, the consistency vector 304 can be any other suitable function of the posterior probabilities vector 508 and the metadata vector 204.

Although the above discussion indicates that the machine learning model 302 can be a triplet network, this is a mere non-limiting example. Those having ordinary skill in the art will appreciate that the machine learning model 302 can, in various cases, exhibit any other suitable machine learning architecture that can be trained/configured to generate distance-based embeddings from raw pixel data.

Figure 6:
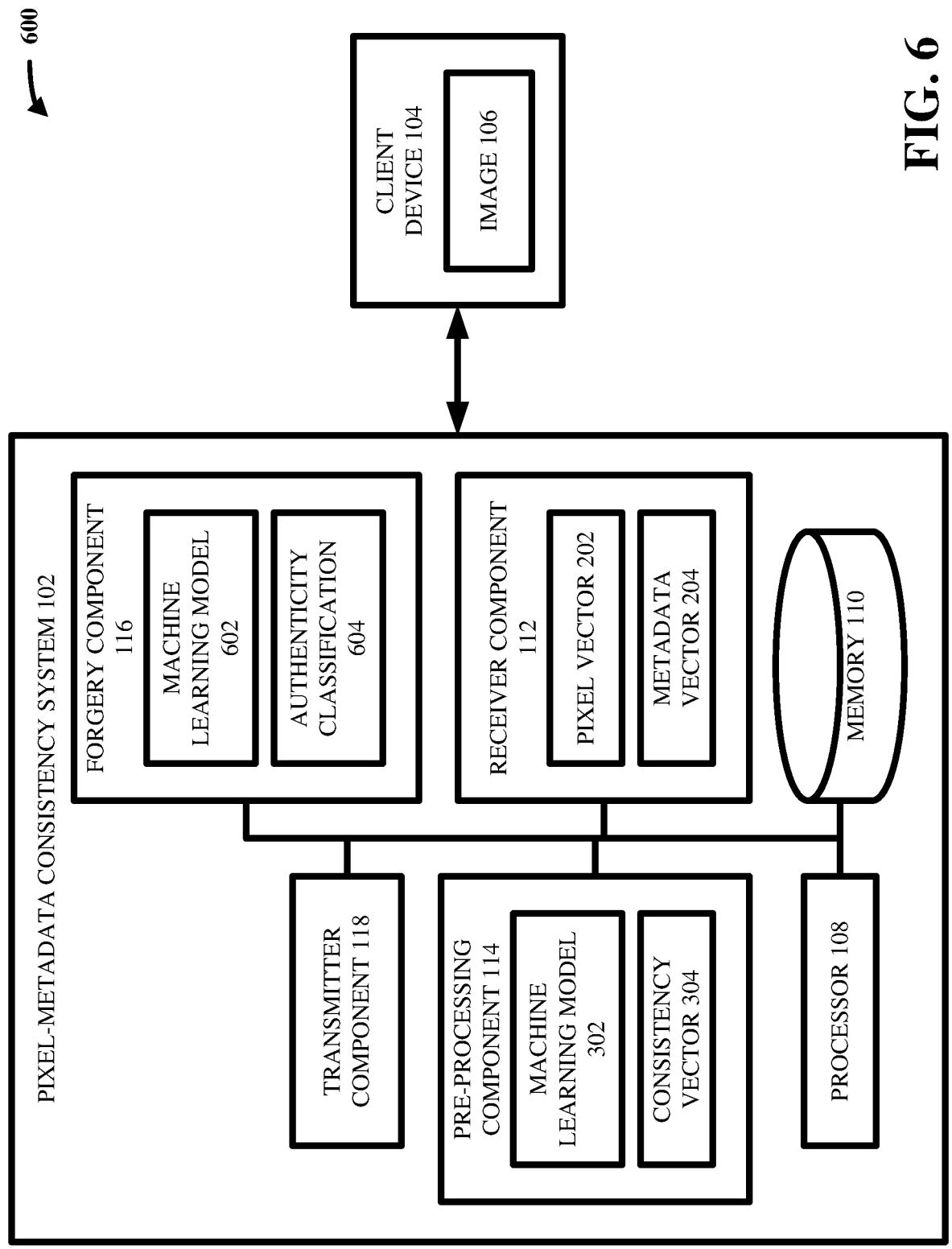
FIG. 6 illustrates a high-level block diagram of an example, non-limiting system including a machine learning model and an authenticity classification that facilitates image forgery detection via pixel-metadata consistency analysis in accordance with one or more embodiments described herein.

FIG. 6 illustrates a high-level block diagram of an example, non-limiting system 600 including a machine learning model and an authenticity classification that can facilitate image forgery detection via pixel-metadata consistency analysis in accordance with one or more embodiments described herein. As shown, the system 600 can, in some cases, comprise the same components as the system 300, and can further comprise a machine learning model 602 and/or an authenticity classification 604.

In various embodiments, the forgery component 116 can electronically control, operate, and/or maintain the machine learning model 602. In various instances, the machine learning model 602 can exhibit any suitable artificial intelligence architecture (e.g., deep learning model, support vector machine, regression model, ensemble model). As a non-limiting example, the machine learning model 602 can be an XGBoost classifier that is trained in a supervised fashion to generate binary authenticity classifications based on consistency vectors as described herein. Accordingly, in various cases, the forgery component 116 can electronically utilize the machine learning model 602 to generate the authenticity classification 604, based on the consistency vector 304. That is, the forgery component 116 can electronically feed the consistency vector 304 as input into the machine learning model 602, and the machine learning model 602 can electronically generate as output the authenticity classification 604. In various cases, the authenticity classification 604 can be a binary label that indicates whether the consistency vector 304, and thus the image 106, is authentic or forged.

Accordingly, the pixel-metadata consistency system 102 can electronically infer an authenticity status of the image 106, by analyzing the pixel vector 202 and the metadata vector 204 with the machine learning model 302 and/or the machine learning model 602. Furthermore, note that such authenticity status can be inferred, even if the metadata vector 204 has undergone malicious editing by a forger/hacker. More specifically, the functionality and/or operations performed by the pre-processing component 114 can ensure that the consistency vector 304 not only contains information regarding what Exif metadata the image 106 actually has (e.g., 204), but also contains information regarding what Exif metadata the image 106 should have, given the pixel vector 202. Because the consistency vector 304 represents what Exif metadata the image 106 should have, the forgery component 116 can detect fraud and/or forgery, even when evidence of such fraud/forgery has been maliciously erased from the metadata vector 204. This constitutes a significant tangible improvement over existing image forgery detection techniques.

Figure 7:
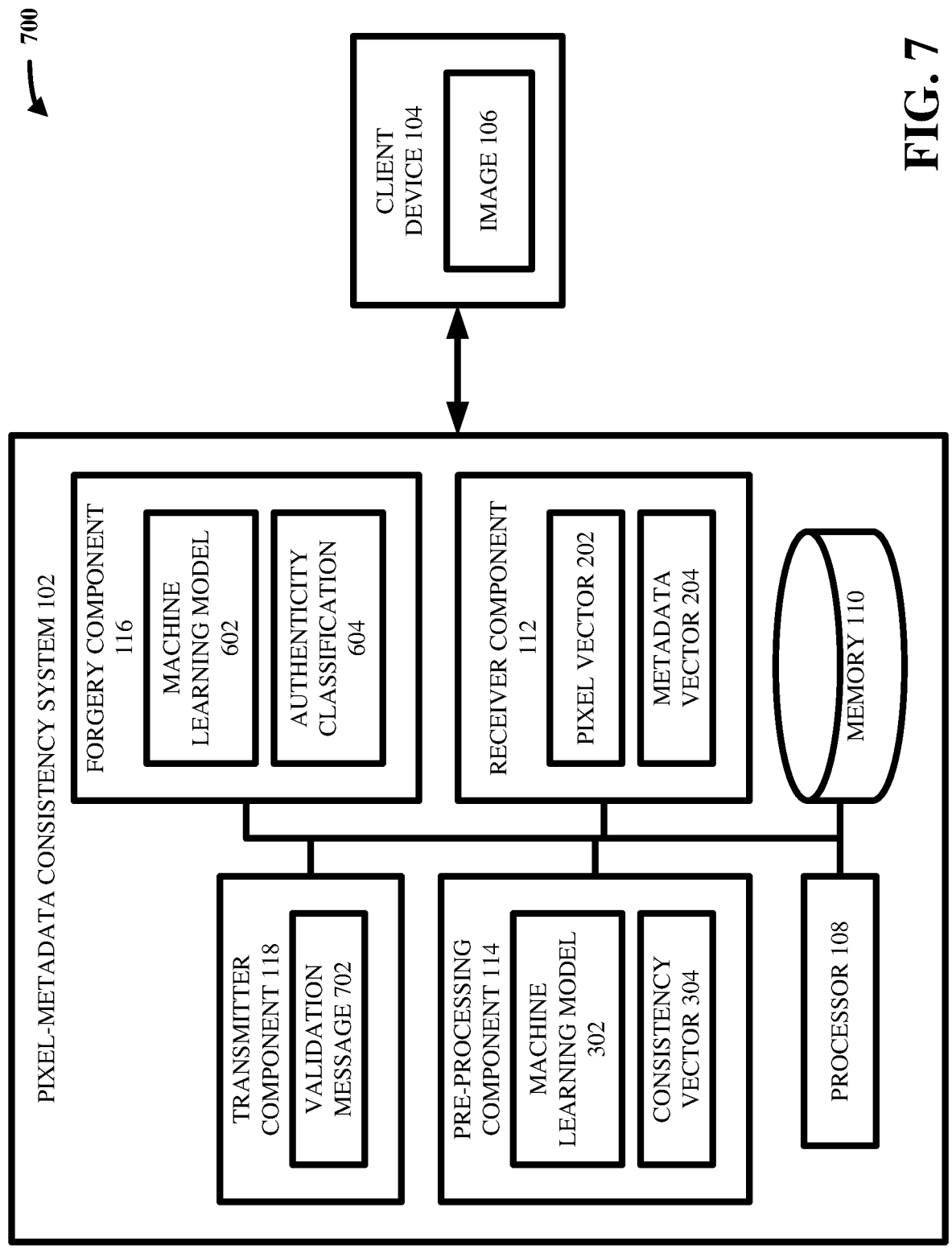
FIG. 7 illustrates a high-level block diagram of an example, non-limiting system including a validation message that facilitates image forgery detection via pixel-metadata consistency analysis in accordance with one or more embodiments described herein.

FIG. 7 illustrates a high-level block diagram of an example, non-limiting system 700 including a validation message that can facilitate image forgery detection via pixel-metadata consistency analysis in accordance with one or more embodiments described herein. As shown, the system 700 can, in some cases, comprise the same components as the system 600, and can further comprise a validation message 702.

In various embodiments, the transmitter component 118 can electronically generate and/or otherwise prepare the validation message 702 based on the authenticity classification 604. That is, the validation message 702 can include, convey, and/or summarize the authenticity classification 604. In other words, the validation message 702 can be considered as a notification of the authenticity classification 604. For instance, if the authenticity classification 604 indicates that the consistency vector 304, and thus the image 106, is authentic, the validation message 702 can indicate that the image 106 is authentic and/or that the image 106 has been successfully validated/verified. On the other hand, if the authenticity classification 604 indicates that the consistency vector 304, and thus the image 106, is forged, the validation message 702 can indicate that the image 106 is forged/fraudulent and/or that the image 106 has failed to be successfully validated/verified. In various aspects, the transmitter component 118 can electronically transmit the validation message 702 to the client device 104, and/or to any other suitable computing device (not shown).

Figure 8:
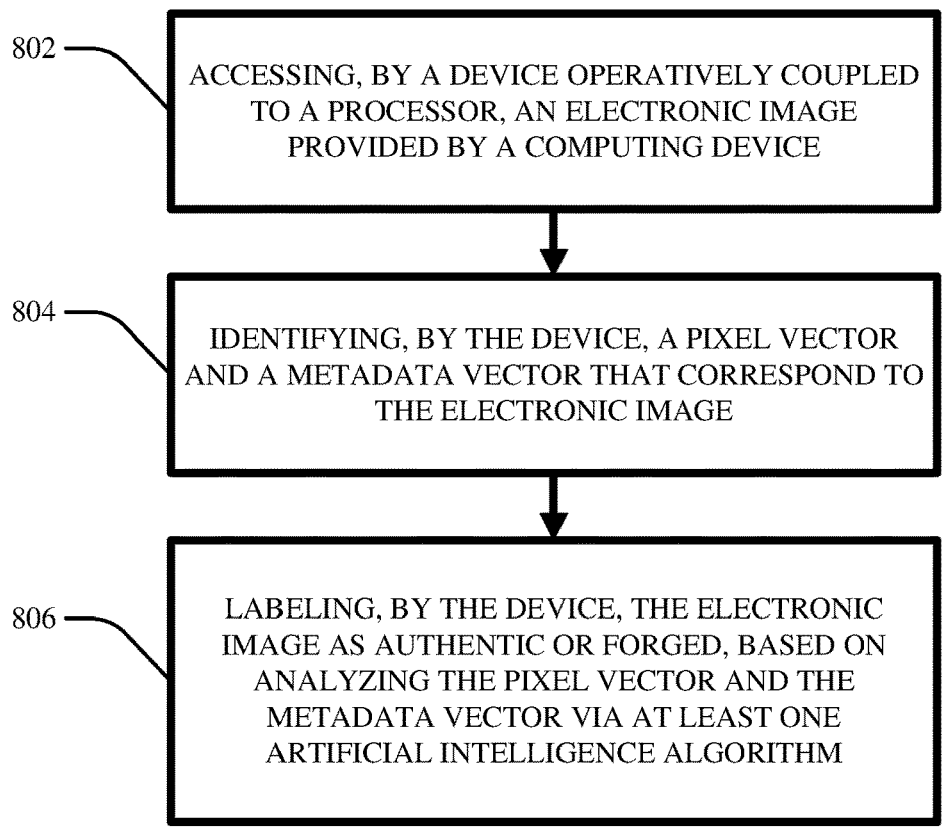
FIG. 8 illustrates a high-level flow diagram of an example, non-limiting computer-implemented method that facilitates image forgery detection via pixel-metadata consistency analysis in accordance with one or more embodiments described herein.

FIG. 8 illustrates a high-level flow diagram of an example, non-limiting computer-implemented method 800 that can facilitate image forgery detection via pixel-metadata consistency analysis in accordance with one or more embodiments described herein. In various cases, the pixel-metadata consistency system 102 can facilitate the computer-implemented method 800.

In various embodiments, act 802 can include accessing, by a device (e.g., 112) operatively coupled to a processor, an electronic image (e.g., 106) provided by a computing device (e.g., 104).

In various aspects, act 804 can include identifying, by the device (e.g., 112), a pixel vector (e.g., 202) and a metadata vector (e.g., 204) that correspond to the electronic image.

In various instances, act 806 can include labeling, by the device (e.g., 116), where 604 can be considered as a label), the electronic image as authentic or forged, based on analyzing (e.g., via 114) the pixel vector and the metadata vector via at least one artificial intelligence algorithm (e.g., 302 and/or 602).

Although not explicitly shown in FIG. 8, the analyzing the pixel vector and the metadata vector via the at least one artificial intelligence algorithm can comprise: executing, by the device (e.g., 114), a first trained artificial intelligence algorithm (e.g., 302) on the pixel vector, wherein the first trained artificial intelligence algorithm generates a predicted metadata vector (e.g., 402) based on the pixel vector; concatenating, by the device (e.g., 114), the predicted metadata vector with the metadata vector, thereby yielding a concatenated vector (e.g., 304); and executing, by the device (e.g., 116), a second trained artificial intelligence algorithm (e.g., 602) on the concatenated vector, wherein the second trained artificial intelligence algorithm classifies the electronic image as authentic or forged (e.g., 604) based on the concatenated vector. In various cases, the first trained artificial intelligence algorithm can be a one-vs-rest classifier, and the second trained artificial intelligence algorithm can be an XGBoost classifier.

Although not explicitly shown in FIG. 8, the analyzing the pixel vector and the metadata vector via the at least one artificial intelligence algorithm can comprise: executing, by the device (e.g., 114), a first trained artificial intelligence algorithm (e.g., 302) on the pixel vector, wherein the first trained artificial intelligence algorithm generates an embedding (e.g., 502) based on the pixel vector; concatenating, by the device (e.g., 114), the embedding with the metadata vector, thereby yielding a first concatenated vector (e.g., 504); applying, by the device (e.g., 114), a Gaussian mixture model (e.g., 506) to the first concatenated vector, thereby yielding a vector of posterior probabilities (e.g., 508); concatenating, by the device (e.g., 114), the vector of posterior probabilities with the metadata vector, thereby yielding a second concatenated vector (e.g., 304); and executing, by the device (e.g., 116), a second trained artificial intelligence algorithm (e.g., 602) on the second concatenated vector, wherein the second trained artificial intelligence algorithm classifies the electronic image as authentic or forged (e.g., 604) based on the second concatenated vector. In various cases, the first trained artificial intelligence algorithm can be a triplet network, and the second trained artificial intelligence algorithm can be an XGBoost classifier.

Although not specifically shown in the figures, another computer-implemented method described herein can include the following: receiving, by a processor (e.g., 112), an image (e.g., 106) of a proof-of-identity document; identifying, by the processor (e.g., 112), a pixel vector (e.g., 202) and a metadata vector (e.g., 204) that correspond to the image; and determining, by the processor (e.g., 116), an authenticity (e.g., 604) of the proof-of-identity document, based on analyzing (e.g., via 302 and/or 602) the pixel vector and the metadata vector.

In various cases, such computer-implemented method can further comprise: in response to determining that the proof-of-identity document is not authentic, generating, by the processor (e.g., 118), a forgery notification (e.g., 702).

In various aspects, the processor can analyze the pixel vector and the metadata vector by: inputting, by the processor (e.g., 114), the pixel vector to a first machine learning model (e.g., 302), which outputs a predicted metadata vector (e.g., 402); and inputting, by the processor (e.g., 116), both the predicted metadata vector and the metadata vector to a second machine learning model (e.g., 602), which outputs an authenticity label (e.g., 604) corresponding to the proof-of-identity document.

In various aspects, the processor can analyze the pixel vector and the metadata vector by: inputting, by the processor (e.g., 114), the pixel vector to a first machine learning model (e.g., 302), which outputs an embedding (e.g., 502); applying, by the processor (e.g., 114), a Gaussian mixture model (e.g., 506) to the embedding, which outputs a vector of posteriors (e.g., 508); and inputting, by the processor (e.g., 116), both the metadata vector and the vector of posteriors to a second machine learning model (e.g., 602), which classifies the proof-of-identity document as either authentic or forged.

Various embodiments described herein include a computerized tool (e.g., 102) that can facilitate image forgery detection via pixel-metadata consistency analysis. In various aspects, the computerized tool can generate a consistency vector (e.g., 304) when given a pixel vector (e.g., 202) and a metadata vector (e.g., 204) of an image (e.g., 106). Moreover, the computerized tool can binarily classify the image as authentic or forged, based on the consistency vector.

As explained herein, the computerized tool can generate the consistency vector in at least two alternative ways. In a first way, a one-vs-rest classifier (e.g., 302 as shown in FIG. 4) can be trained to take in pixel vectors and to predict metadata features (e.g., Exif tags) based on the pixel vectors. During inference time, when given an image (e.g., 106) that has a pixel vector (e.g., 202) and a metadata vector (e.g., 204), the one-vs-rest classifier can predict metadata (e.g., 402) for the image, based on the pixel vector. In various cases, the predicted metadata can be subtracted from the metadata vector and then concatenated with the metadata vector. Such result can be considered as the consistency vector (e.g., 304).

As recognized by the inventors, the intuition behind this first way of generating the consistency vector is as follows. The one-vs-rest classifier can learn to infer metadata information from raw pixels. Thus, if the predicted metadata features are inconsistent with the actual, readable metadata features that are appended to an image, this can indicate and/or suggest that the actual, readable metadata of the image has been maliciously edited and/or modified, which is a sign of forgery. In various cases, the difference between the predicted metadata and the actual, readable metadata can be considered as a good indication of pixel-metadata consistency.

In various cases, the inventors recognized that the same intuition can be implemented in a second, alternative way. In various instances, a triplet network (e.g., 302 as shown in FIG. 5) can be trained to generate metadata embeddings (e.g., 502) based on image pixels (e.g., 202). In various aspects, the metadata embedding can be concatenated (e.g., yielding 504) with the actual, readable metadata (e.g., 204). Moreover, in various cases, Gaussian mixture modeling (e.g., 506) can be applied, so as to extract posterior probabilities (e.g., 508) of the concatenation, and such posterior probabilities can be concatenated with the actual, readable metadata to yield the consistency vector.

In various cases, once the consistency vector is generated, the computerized tool can pass the consistency vector to a trained XGBoost classifier (e.g., 602) for binary classification (e.g., forged vs. authentic).

The inventors of various embodiments described herein experimentally verified the performance of such a computerized tool. The dataset that the inventors used contained 13,000 proof-of-identity image files, out of which about 700 were known to be forged and the remainder were known to be authentic. The inventors used 3,000 of such images for training of the computerized tool described herein and the remaining 10,000 images for evaluation of the computerized tool. The inventors found that implementation of such a computerized tool resulted in a 7% increase in recall, a 1% increase in F-score, and a reduction in false positive rate by 6.4% as compared to existing techniques. Accordingly, the computerized tool described herein certainly constitutes a useful and practical application of computers.

Note that, although the herein disclosure mainly describes the pixel vector 202 as representing the entirety of the image 106, this is a mere non-limiting example. Those having ordinary skill in the art will appreciate that, in various embodiments, multiple pixel vectors can be implemented, with each pixel vector representing a respectively corresponding patch of the image 106. In such embodiments, multiple metadata vectors can likewise be implemented, with each metadata vector representing a respectively corresponding patch of the image 106.

To facilitate some of the above-described machine learning aspects of various embodiments of the subject innovation, consider the following discussion of artificial intelligence. Various embodiments of the present innovation herein can employ artificial intelligence (AI) to facilitate automating one or more features of the present innovation. The components can employ various AI-based schemes for carrying out various embodiments/examples disclosed herein. In order to provide for or aid in the numerous determinations (e.g., determine, ascertain, infer, calculate, predict, prognose, estimate, derive, forecast, detect, compute) of the present innovation, components of the present innovation can examine the entirety or a subset of the data to which it is granted access and can provide for reasoning about or determine states of the system and/or environment from a set of observations as captured via events and/or data. Determinations can be employed to identify a specific context or action, or can generate a probability distribution over states, for example. The determinations can be probabilistic; that is, the computation of a probability distribution over states of interest based on a consideration of data and events. Determinations can also refer to techniques employed for composing higher-level events from a set of events and/or data.

Such determinations can result in the construction of new events or actions from a set of observed events and/or stored event data, whether or not the events are correlated in close temporal proximity, and whether the events and data come from one or several event and data sources. Components disclosed herein can employ various classification (explicitly trained (e.g., via training data) as well as implicitly trained (e.g., via observing behavior, preferences, historical information, receiving extrinsic information, and so on)) schemes and/or systems (e.g., support vector machines, neural networks, expert systems, Bayesian belief networks, fuzzy logic, data fusion engines, and so on) in connection with performing automatic and/or determined action in connection with the claimed subject matter. Thus, classification schemes and/or systems can be used to automatically learn and perform a number of functions, actions, and/or determinations.

A classifier can map an input attribute vector, $z=(z1, z2, z3, z4, zn)$, to a confidence that the input belongs to a class, as by $f(z)=confidence(class)$. Such classification can employ a probabilistic and/or statistical-based analysis (e.g., factoring into the analysis utilities and costs) to determinate an action to be automatically performed. A support vector machine (SVM) can be an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and/or probabilistic classification models providing different patterns of independence, any of which can be employed. Classification as used herein also is inclusive of statistical regression that is utilized to develop models of priority.

Those having ordinary skill in the art will appreciate that the herein disclosure describes non-limiting examples of various embodiments of the subject innovation. For ease of description and/or explanation, various portions of the herein disclosure utilize the term "each" when discussing various embodiments of the subject innovation. Those having ordinary skill in the art will appreciate that such usages of the term "each" are non-limiting examples. In other words, when the herein disclosure provides a description that is applied to "each" of some particular computerized object and/or component, it should be understood that this is a non-limiting example of various embodiments of the subject innovation, and it should be further understood that, in various other embodiments of the subject innovation, it can be the case that such description applies to fewer than "each" of that particular computerized object.

Figure 9:
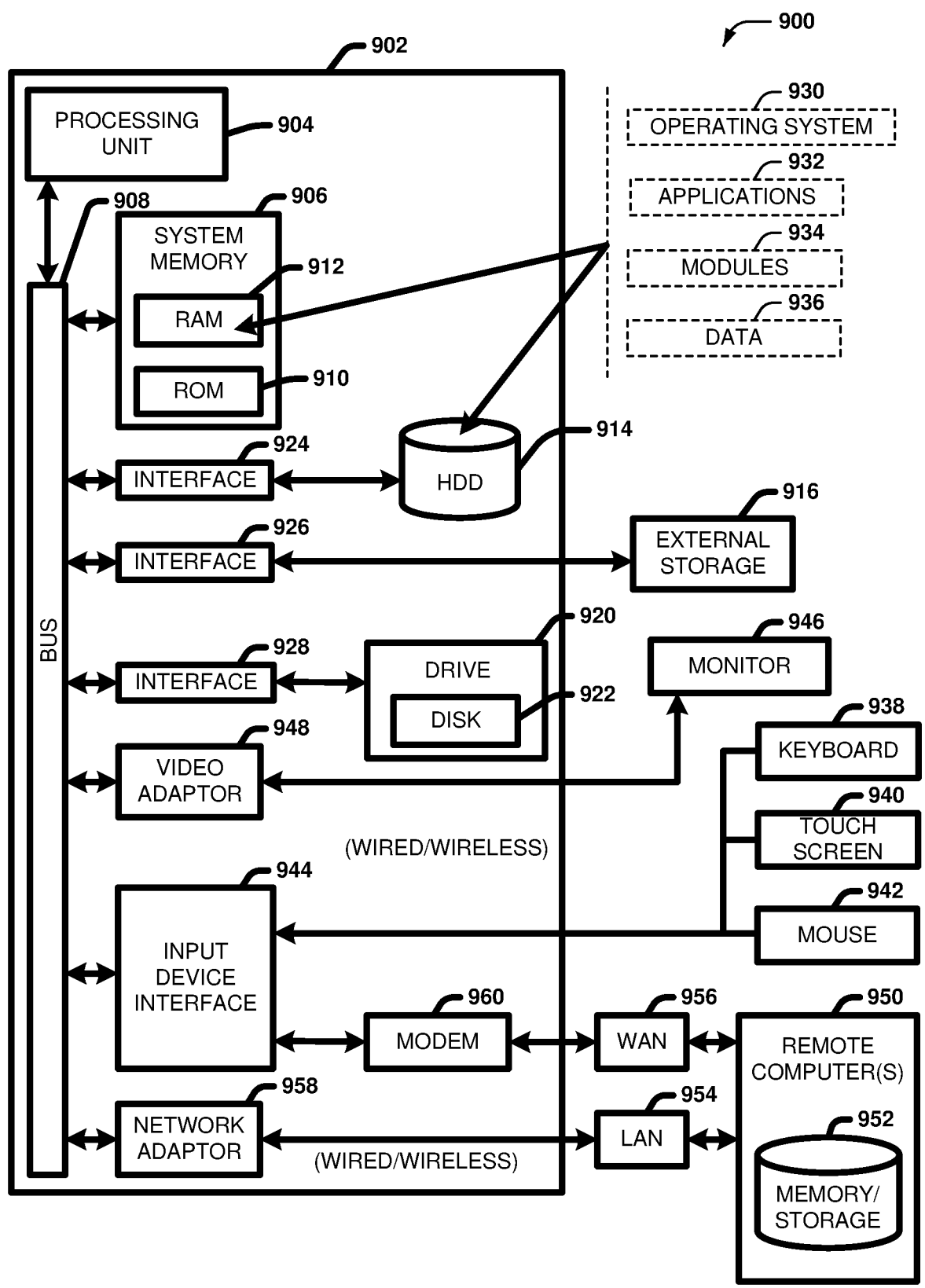
FIG. 9 illustrates a block diagram of an example, non-limiting operating environment in which one or more embodiments described herein can be facilitated.

In order to provide additional context for various embodiments described herein, FIG. 9 and the following discussion are intended to provide a brief, general description of a suitable computing environment 900 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 9, the example environment 900 for implementing various embodiments of the aspects described herein includes a computer 902, the computer 902 including a processing unit 904, a system memory 906 and a system bus 908. The system bus 908 couples system components including, but not limited to, the system memory 906 to the processing unit 904. The processing unit 904 can be any of various commercially available processors. Dual microprocessors and other multi processor architectures can also be employed as the processing unit 904.

The system bus 908 can be any of several types of bus structure that can further interconnect to a memory bus (with or without a memory controller), a peripheral bus, and a local bus using any of a variety of commercially available bus architectures. The system memory 906 includes ROM 910 and RAM 912. A basic input/output system (BIOS) can be stored in a non-volatile memory such as ROM, erasable programmable read only memory (EPROM), EEPROM, which BIOS contains the basic routines that help to transfer information between elements within the computer 902, such as during startup. The RAM 912 can also include a high-speed RAM such as static RAM for caching data.

The computer 902 further includes an internal hard disk drive (HDD) 914 (e.g., EIDE, SATA), one or more external storage devices 916 (e.g., a magnetic floppy disk drive (FDD) 916, a memory stick or flash drive reader, a memory card reader, etc.) and a drive 920, e.g., such as a solid state drive, an optical disk drive, which can read or write from a disk 922, such as a CD-ROM disc, a DVD, a BD, etc. Alternatively, where a solid state drive is involved, disk 922 would not be included, unless separate. While the internal HDD 914 is illustrated as located within the computer 902, the internal HDD 914 can also be configured for external use in a suitable chassis (not shown). Additionally, while not shown in environment 900, a solid state drive (SSD) could be used in addition to, or in place of, an HDD 914. The HDD 914, external storage device(s) 916 and drive 920 can be connected to the system bus 908 by an HDD interface 924, an external storage interface 926 and a drive interface 928, respectively. The interface 924 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 902, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 912, including an operating system 930, one or more application programs 932, other program modules 934 and program data 936. All or portions of the operating system, applications, modules, and/or data can also be cached in the RAM 912. The systems and methods described herein can be implemented utilizing various commercially available operating systems or combinations of operating systems.

Computer 902 can optionally comprise emulation technologies. For example, a hypervisor (not shown) or other intermediary can emulate a hardware environment for operating system 930, and the emulated hardware can optionally be different from the hardware illustrated in FIG. 9. In such an embodiment, operating system 930 can comprise one virtual machine (VM) of multiple VMs hosted at computer 902. Furthermore, operating system 930 can provide runtime environments, such as the Java runtime environment or the .NET framework, for applications 932. Runtime environments are consistent execution environments that allow applications 932 to run on any operating system that includes the runtime environment. Similarly, operating system 930 can support containers, and applications 932 can be in the form of containers, which are lightweight, standalone, executable packages of software that include, e.g., code, runtime, system tools, system libraries and settings for an application.

Further, computer 902 can be enable with a security module, such as a trusted processing module (TPM). For instance with a TPM, boot components hash next in time boot components, and wait for a match of results to secured values, before loading a next boot component. This process can take place at any layer in the code execution stack of computer 902, e.g., applied at the application execution level or at the operating system (OS) kernel level, thereby enabling security at any level of code execution.

A user can enter commands and information into the computer 902 through one or more wired/wireless input devices, e.g., a keyboard 938, a touch screen 940, and a pointing device, such as a mouse 942. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 904 through an input device interface 944 that can be coupled to the system bus 908, but can be connected by other interfaces, such as a parallel port, an IEEE 1394 serial port, a game port, a USB port, an IR interface, a BLUETOOTH® interface, etc.

A monitor 946 or other type of display device can be also connected to the system bus 908 via an interface, such as a video adapter 948. In addition to the monitor 946, a computer typically includes other peripheral output devices (not shown), such as speakers, printers, etc.

The computer 902 can operate in a networked environment using logical connections via wired and/or wireless communications to one or more remote computers, such as a remote computer(s) 950. The remote computer(s) 950 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 952 is illustrated. The logical connections depicted include wired/wireless connectivity to a local area network (LAN) 954 and/or larger networks, e.g., a wide area network (WAN) 956. Such LAN and WAN networking environments are commonplace in offices and companies, and facilitate enterprise-wide computer networks, such as intranets, all of which can connect to a global communications network, e.g., the Internet.

When used in a LAN networking environment, the computer 902 can be connected to the local network 954 through a wired and/or wireless communication network interface or adapter 958. The adapter 958 can facilitate wired or wireless communication to the LAN 954, which can also include a wireless access point (AP) disposed thereon for communicating with the adapter 958 in a wireless mode.

When used in a WAN networking environment, the computer 902 can include a modem 960 or can be connected to a communications server on the WAN 956 via other means for establishing communications over the WAN 956, such as by way of the Internet. The modem 960, which can be internal or external and a wired or wireless device, can be connected to the system bus 908 via the input device interface 944. In a networked environment, program modules depicted relative to the computer 902 or portions thereof, can be stored in the remote memory/storage device 952. It will be appreciated that the network connections shown are example and other means of establishing a communications link between the computers can be used.

When used in either a LAN or WAN networking environment, the computer 902 can access cloud storage systems or other network-based storage systems in addition to, or in place of, external storage devices 916 as described above, such as but not limited to a network virtual machine providing one or more aspects of storage or processing of information. Generally, a connection between the computer 902 and a cloud storage system can be established over a LAN 954 or WAN 956 e.g., by the adapter 958 or modem 960, respectively. Upon connecting the computer 902 to an associated cloud storage system, the external storage interface 926 can, with the aid of the adapter 958 and/or modem 960, manage storage provided by the cloud storage system as it would other types of external storage. For instance, the external storage interface 926 can be configured to provide access to cloud storage sources as if those sources were physically connected to the computer 902.

The computer 902 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Figure 10:
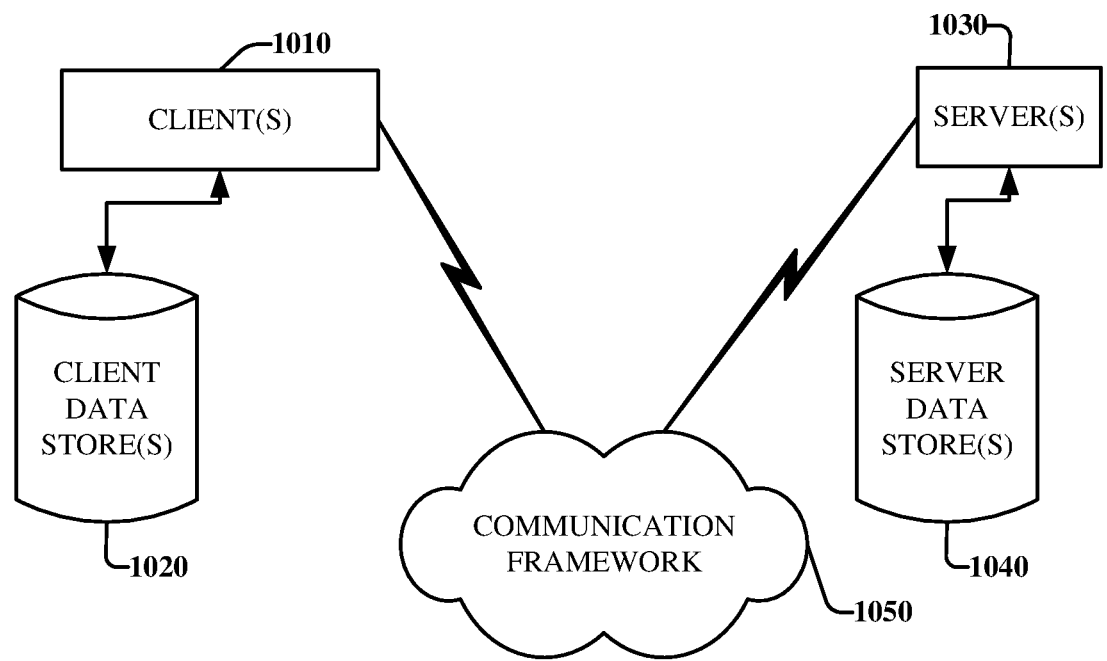
FIG. 10 illustrates an example networking environment operable to execute various implementations described herein.

FIG. 10 is a schematic block diagram of a sample computing environment 1000 with which the disclosed subject matter can interact. The sample computing environment 1000 includes one or more client(s) 1010. The client(s) 1010 can be hardware and/or software (e.g., threads, processes, computing devices). The sample computing environment 1000 also includes one or more server(s) 1030. The server(s) 1030 can also be hardware and/or software (e.g., threads, processes, computing devices). The servers 1030 can house threads to perform transformations by employing one or more embodiments as described herein, for example. One possible communication between a client 1010 and a server 1030 can be in the form of a data packet adapted to be transmitted between two or more computer processes. The sample computing environment 1000 includes a communication framework 1050 that can be employed to facilitate communications between the client(s) 1010 and the server(s) 1030. The client(s) 1010 are operably connected to one or more client data store(s) 1020 that can be employed to store information local to the client(s) 1010. Similarly, the server(s) 1030 are operably connected to one or more server data store(s) 1040 that can be employed to store information local to the servers 1030.

Various embodiments described herein may be a system, a method, an apparatus and/or a computer program product at any possible technical detail level of integration. The computer program product can include a computer readable storage medium (or media) having computer readable program instructions thereon for causing a processor to carry out aspects of various embodiments described herein. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of various embodiments described herein can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of various embodiments described herein.

Aspects of various embodiments are described herein with reference to flowchart illustrations and/or block diagrams of methods, apparatus (systems), and computer program products according to various embodiments described herein. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments described herein. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
   a processor that executes computer-executable instructions stored in a computer-readable memory, which causes the processor to:
   receive, from a client device, an electronic image;
   obtain a pixel vector and an image metadata vector that correspond to the electronic image; and
   determine whether the electronic image is authentic or forged, based on analyzing the pixel vector and the image metadata vector via at least one machine learning model, wherein the analyzing the pixel vector and the image metadata vector via the at least one machine learning model comprises:
   executing a first trained machine learning model on the pixel vector, wherein the first trained machine learning model is configured to generate a predicted metadata vector based on the pixel vector, and wherein the first trained machine learning model is a one-vs-rest classifier;
   concatenating the predicted metadata vector with the image metadata vector, thereby yielding a concatenated vector; and executing a second trained machine learning model on the concatenated vector, wherein the second trained machine learning model is configured to classify the electronic image as authentic or forged based on the concatenated vector, and wherein the second trained machine learning model is an XGBoost classifier.

2. The system of claim 1, wherein the computer-executable instructions are further executable to cause the processor to:
in response to determining that the electronic image is forged, transmit an unsuccessful validation message to the client device.

3. The system of claim 1, wherein the image metadata vector is an Exif vector associated with the electronic image.

4. A computer-implemented method, comprising:
accessing, by a device operatively coupled to a processor, an electronic image provided by a computing device;
identifying, by the device, a pixel vector and a metadata vector that correspond to the electronic image; and
labeling, by the device, the electronic image as authentic or forged, based on analyzing the pixel vector and the metadata vector via at least one artificial intelligence algorithm, wherein the analyzing the pixel vector and the metadata vector via the at least one artificial intelligence algorithm comprises:
executing, by the device, a first trained artificial intelligence algorithm on the pixel vector, wherein the first trained artificial intelligence algorithm generates a predicted metadata vector based on the pixel vector, and wherein the first trained artificial intelligence algorithm is a one-vs-rest classifier;
concatenating, by the device, the predicted metadata vector with the metadata vector, thereby yielding a concatenated vector; and
executing, by the device, a second trained artificial intelligence algorithm on the concatenated vector, wherein the second trained artificial intelligence algorithm classifies the electronic image as authentic or forged based on the concatenated vector, and wherein the second trained artificial intelligence algorithm is an XGBoost classifier.

5. The computer-implemented method of claim 4, wherein the metadata vector is an Exif vector that includes a camera model feature which identifies a type of camera that captured the electronic image.

6. The computer-implemented method of claim 4, wherein the metadata vector is an Exif vector that includes a software feature which identifies a type of software in which the electronic image was opened.

7. A computer program product for facilitating image forgery detection via pixel-metadata consistency analysis, the computer program product comprising a non-transitory computer-readable medium having program instructions embodied therewith, the program instructions executable by a processor to cause the processor to:
receive, by the processor, an image of a proof-of-identity document;
identify, by the processor, a pixel vector and a metadata vector that correspond to the image; and
determine, by the processor, an authenticity of the proof-of-identity document, based on analyzing the pixel vector and the metadata vector, wherein the processor analyzes the pixel vector and the metadata vector by:
inputting, by the processor, the pixel vector to a first machine learning model, which outputs a predicted metadata vector, and wherein the first machine learning model is a one-vs-rest classifier; and
inputting, by the processor, both the predicted metadata vector and the metadata vector to a second machine learning model, which outputs an authenticity label corresponding to the proof-of-identity document.

8. The computer program product of claim 7, wherein the program instructions are further executable to cause the processor to:
in response to determining that the proof-of-identity document is not authentic, generate, by the processor, a forgery notification.

\* \* \* \* \*